United States Patent
Nguyen

(10) Patent No.: US 11,055,960 B2
(45) Date of Patent: Jul. 6, 2021

(54) GAMING APPARATUS SUPPORTING VIRTUAL PERIPHERALS AND FUNDS TRANSFER

(71) Applicant: Nguyen Gaming LLC, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 0 days.

(21) Appl. No.: 16/600,395

(22) Filed: Oct. 11, 2019

(65) Prior Publication Data

US 2020/0043290 A1 Feb. 6, 2020

Related U.S. Application Data

(63) Continuation of application No. 15/428,922, filed on Feb. 9, 2017, now Pat. No. 10,497,212, which is a
(Continued)

(51) Int. Cl.
*G07F 17/32* (2006.01)
*A63F 13/235* (2014.01)
(Continued)

(52) U.S. Cl.
CPC ........ *G07F 17/3246* (2013.01); *A63F 13/235* (2014.09); *A63F 13/31* (2014.09);
(Continued)

(58) Field of Classification Search
None
See application file for complete search history.

(56) References Cited

U.S. PATENT DOCUMENTS 2,033,638 A 3/1936 Koppl
2,062,923 A 12/1936 Nagy
(Continued)

FOREIGN PATENT DOCUMENTS

GB 2033638 5/1980
GB 2062923 5/1981
(Continued)

OTHER PUBLICATIONS

"Professional Casino Slot Machine". Posted at <www.vbtutor.net/VB_Sample/vbslot2.htm> on Oct. 20, 2009 (Year: 2009).*
(Continued)

*Primary Examiner* — Scott B Christensen

(57) ABSTRACT

In one embodiment, a peripheral management device may have a controller configured to communicate with a gaming machine and a portable electronic device. The controller may be configured to: (i) receive a peripheral data packet from a gaming machine processor, the peripheral data packet including at least one command; (ii) determine whether to process the peripheral data packet on at least one peripheral device of the gaming machine or at least one virtual peripheral device of the portable electronic device; (iii) generate an instructional data packet for the at least one virtual peripheral device if the peripheral data packet is determined to be processed on the at least one virtual peripheral device; and (iv) transmit the instructional data packet to the portable electronic device.

20 Claims, 28 Drawing Sheets

Related U.S. Application Data continuation of application No. 14/993,055, filed on Jan. 11, 2016, now Pat. No. 10,614,660, which is a continuation of application No. 12/945,889, filed on Nov. 14, 2010, now Pat. No. 9,235,952.

(51) Int. Cl.
*A63F 13/31* (2014.01)
*A63F 13/71* (2014.01)
*G06F 3/16* (2006.01)
*G07F 17/34* (2006.01)

(52) U.S. Cl.
CPC .............. *A63F 13/71* (2014.09); *G06F 3/167* (2013.01); *G07F 17/3209* (2013.01); *G07F 17/3211* (2013.01); *G07F 17/3218* (2013.01); *G07F 17/3223* (2013.01); *G07F 17/3225* (2013.01); *G07F 17/3241* (2013.01); *G07F 17/3244* (2013.01); *G07F 17/3251* (2013.01); *G07F 17/3288* (2013.01); *G07F 17/34* (2013.01)

(56) References Cited

U.S. PATENT DOCUMENTS

| | | |
|---|---|---|
| 4,741,539 A | 5/1988 | Sutton et al. |
| 4,948,138 A | 8/1990 | Pease et al. |
| 5,067,712 A | 11/1991 | Georgilas |
| 5,275,400 A | 1/1994 | Weingardt |
| 5,429,361 A | 7/1995 | Raven et al. |
| 5,489,103 A | 2/1996 | Okamoto |
| 5,618,232 A | 4/1997 | Martin |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,271 A | 11/2000 | Kadici |
| 6,146,273 A | 11/2000 | Olsen |
| 6,165,071 A | 12/2000 | Weiss |
| 6,231,445 B1 | 5/2001 | Acres |
| 6,244,958 B1 | 6/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beni et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,699,128 B1 | 3/2004 | Beadell |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers et al. |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| 7,198,571 B2 | 4/2007 | LeMay |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |

(56) References Cited

U.S. PATENT DOCUMENTS

| | | |
|---|---|---|
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir et al. |
| 7,722,453 B2 | 5/2010 | Lark et al. |
| 7,742,996 B1 | 6/2010 | Kwan |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh et al. |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Hornik |
| 8,430,745 B2 | 4/2013 | Agarwal et al. |
| 8,461,958 B2 | 6/2013 | Saenz |
| 8,465,368 B2 | 6/2013 | Hardy et al. |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,678,901 B1 | 3/2014 | Kelly |
| 8,696,470 B2 | 4/2014 | Nguyen |
| 8,745,417 B2 | 6/2014 | Huang et al. |
| 8,834,254 B2 | 9/2014 | Buchholz et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson et al. |
| 9,576,425 B2 | 2/2017 | Nguyen |
| 9,626,826 B2 | 4/2017 | Nguyen |
| 9,666,015 B2 | 5/2017 | Acres |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,068,429 B2 | 9/2018 | Gagner et al. |
| 10,115,270 B2 | 10/2018 | Gagner et al. |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 10,818,133 B2 | 10/2020 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0025272 A1 | 9/2001 | Mori |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0107065 A1 | 8/2002 | Rowe |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0145051 A1 | 10/2002 | Charrin |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0004871 A1 | 1/2003 | Rowe et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082384 A1 | 4/2004 | Walker |
| 2004/0082385 A1 | 4/2004 | Silva et al. |
| 2004/0094624 A1 | 5/2004 | Fernandes |
| 2004/0106449 A1 | 6/2004 | Walker et al. |
| 2004/0127277 A1 | 7/2004 | Walker |
| 2004/0127290 A1 | 7/2004 | Walker et al. |

(56) References Cited

U.S. PATENT DOCUMENTS

| | | |
|---|---|---|
| 2004/0137987 A1 | 7/2004 | Nguyen et al. |
| 2004/0142744 A1 | 7/2004 | Atkinson |
| 2004/0147308 A1 | 7/2004 | Walker et al. |
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | Odonovan et al. |
| 2004/0229671 A1 | 11/2004 | Stronach |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0043996 A1 | 2/2005 | Silver |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0208993 A1 | 9/2005 | Yoshizawa |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0121972 A1 | 6/2006 | Walker |
| 2006/0126529 A1 | 6/2006 | Hardy |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0256135 A1 | 11/2006 | Aoyama |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0129148 A1 | 6/2007 | Van Luchene |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259716 A1 | 11/2007 | Mattice |
| 2007/0259717 A1 | 11/2007 | Mattice et al. |
| 2007/0265984 A1 | 11/2007 | Santhana |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0020845 A1 | 1/2008 | Low |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102956 A1 | 5/2008 | Burman et al. |
| 2008/0102957 A1 | 5/2008 | Burnman et al. |
| 2008/0108401 A1 | 5/2008 | Baerlocker et al. |
| 2008/0113772 A1 | 5/2008 | Burrill et al. |
| 2008/0119267 A1 | 5/2008 | Denlay |
| 2008/0013906 A1 | 6/2008 | Lutnick |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sanders et al. |
| 2008/0254881 A1 | 10/2008 | Lutnick et al. |
| 2008/0254883 A1 | 10/2008 | Patel et al. |
| 2008/0254891 A1 | 10/2008 | Sanders et al. |
| 2008/0254892 A1 | 10/2008 | Sanders et al. |
| 2008/0254897 A1 | 10/2008 | Sanders et al. |
| 2008/0263173 A1 | 10/2008 | Weber et al. |
| 2008/0268959 A1 | 10/2008 | Bryson |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0017906 A1 | 1/2009 | Jackson |
| 2009/0021381 A1 | 1/2009 | Higuchi |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |

(56) References Cited

U.S. PATENT DOCUMENTS

| | | |
|---|---|---|
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131146 A1 | 5/2009 | Arezina et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0143141 A1 | 6/2009 | Wells |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0270166 A1 | 10/2009 | Thukral |
| 2009/0270170 A1 | 10/2009 | Patton |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur et al. |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0105454 A1 | 4/2010 | Weber et al. |
| 2010/0106612 A1 | 4/2010 | Gupta |
| 2010/0115591 A1 | 5/2010 | Kane-Esrig |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0184509 A1 | 7/2010 | Sylla |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speer et al. |
| 2010/0227670 A1 | 9/2010 | Arezine et al. |
| 2010/0227671 A1 | 9/2010 | Laaroussi |
| 2010/0227687 A1 | 9/2010 | Speer et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speer et al. |
| 2011/0039615 A1 | 2/2011 | Acres |
| 2011/0053679 A1 | 3/2011 | Canterbury et al. |
| 2011/0065492 A1 | 3/2011 | Acres |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0244952 A1 | 10/2011 | Schueller |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0103965 A1 | 4/2013 | Golembeski |
| 2013/0104193 A1 | 4/2013 | Gatto et al. |
| 2013/0130766 A1 | 5/2013 | Harris et al. |
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0316808 A1 | 11/2013 | Nelson |
| 2013/0337878 A1 | 12/2013 | Shepherd |
| 2013/0337889 A1 | 12/2013 | Gagner |
| 2014/0006129 A1 | 1/2014 | Heath |
| 2014/0057716 A1 | 2/2014 | Massing et al. |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 5/2015 | Phegade |
| 2016/0125695 A1 | 5/2016 | Nguyen |
| 2017/0016819 A1 | 4/2017 | Nguyen |

(56) References Cited

U.S. PATENT DOCUMENTS

| | | |
|---|---|---|
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |
| 2019/0122490 A1 | 4/2019 | Nguyen |
| 2019/0122492 A1 | 4/2019 | Nguyen |
| 2019/0213829 A1 | 7/2019 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.

(56) References Cited

OTHER PUBLICATIONS

Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.

(56) References Cited

OTHER PUBLICATIONS

Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162,358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 15/835,448, dated Mar. 5, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 16/190,050, dated Jun. 1, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
Office Action for U.S. Appl. No. 16/449,717, dated Nov. 9, 2020.

* cited by examiner

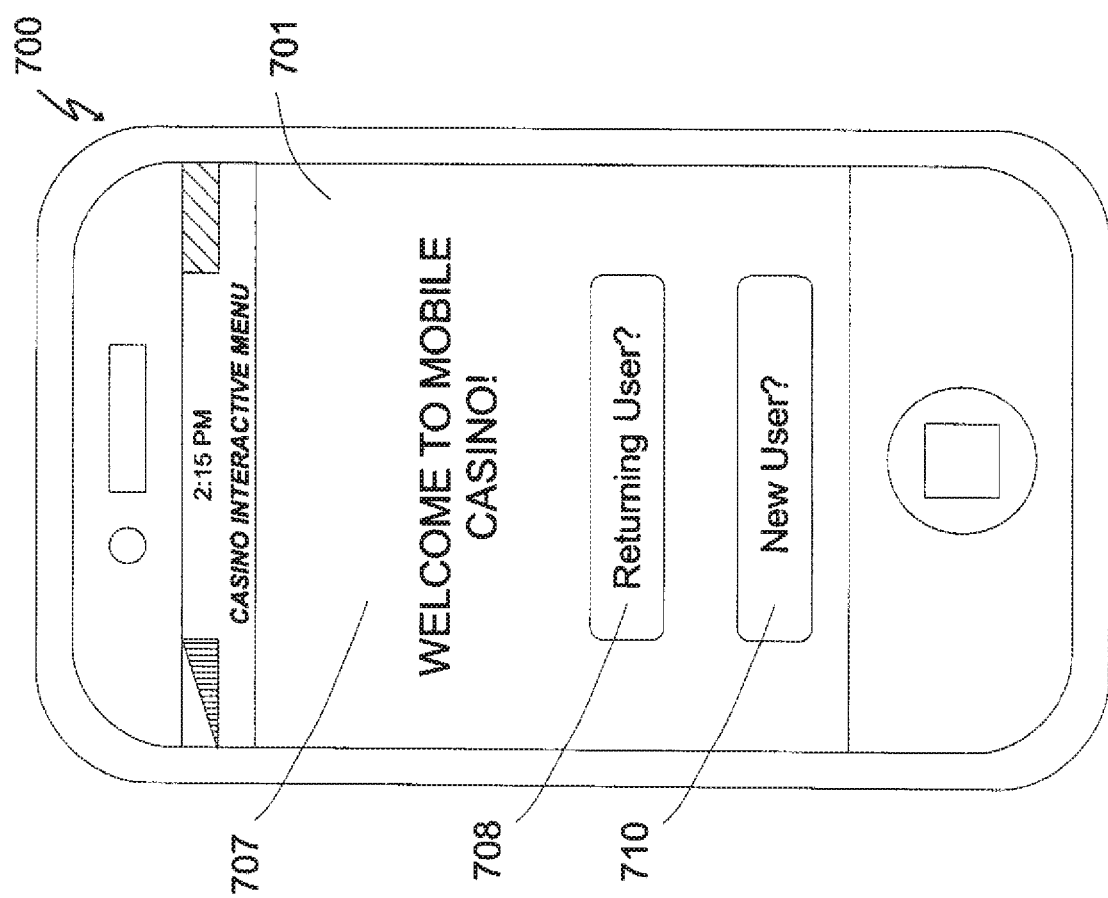

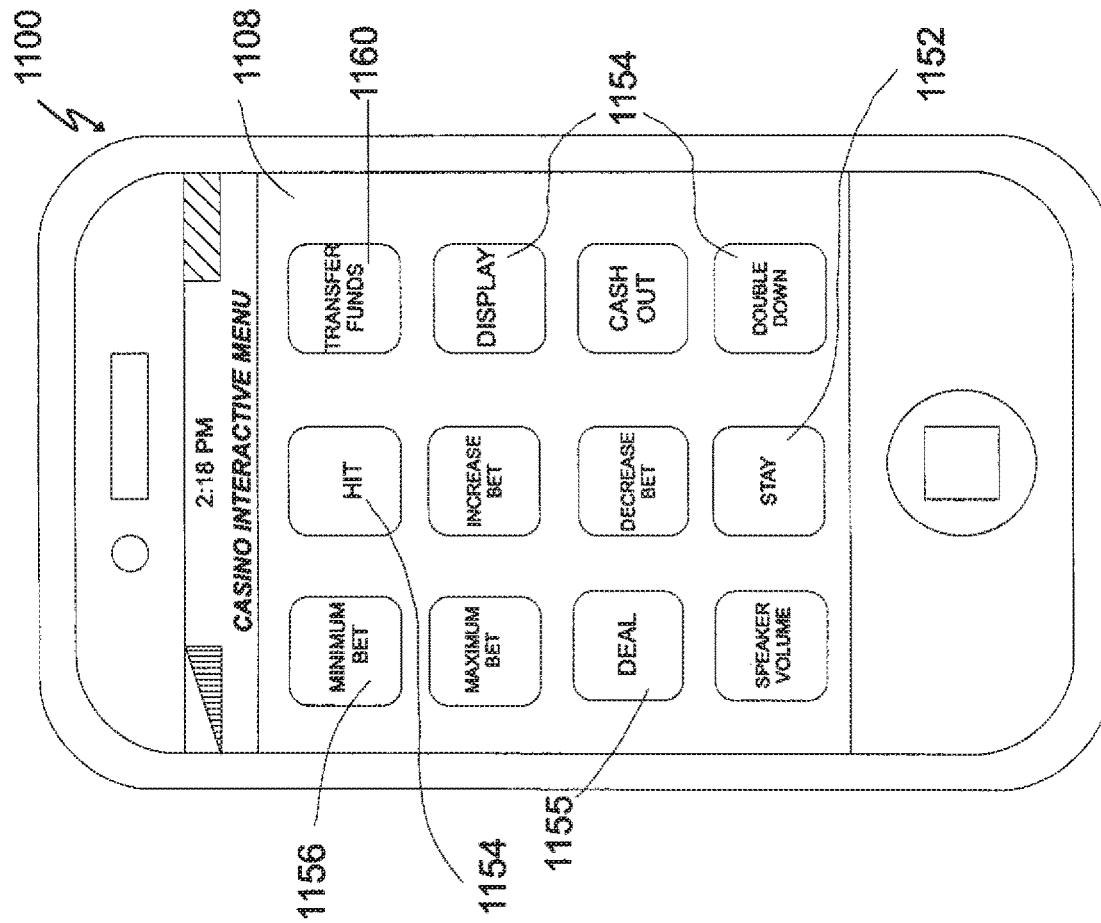

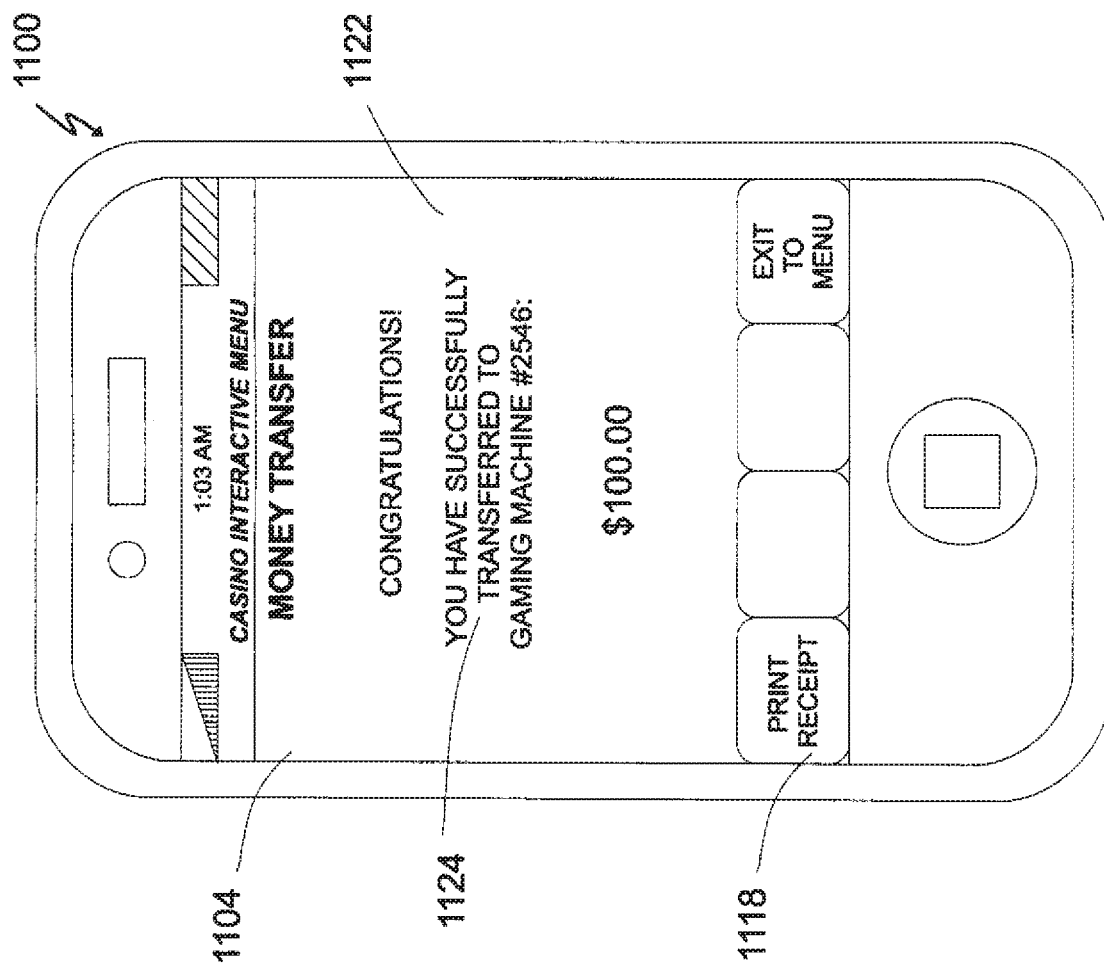

GAMING APPARATUS SUPPORTING VIRTUAL PERIPHERALS AND FUNDS TRANSFER

CROSS-REFERENCE TO RELATED APPLICATIONS

This application is a continuation of U.S. application Ser. No. 15/428,922, filed Feb. 9, 2017, and entitled "GAMING APPARATUS SUPPORTING VIRTUAL PERIPHERALS AND FUNDS TRANSFER," which is hereby incorporated herein by reference, and which in turn is a continuation of U.S. application Ser. No. 14/993,055, filed Jan. 11, 2016, and entitled "PERIPHERAL MANAGEMENT DEVICE FOR VIRTUAL GAME INTERACTION," which is hereby incorporated herein by reference, and which in turn is a continuation of U.S. application Ser. No. 12/945,889, filed Nov. 14, 2010, and entitled "PERIPHERAL MANAGEMENT DEVICE FOR VIRTUAL GAME INTERACTION" (now U.S. Pat. No. 9,235,952), which is hereby incorporated herein by reference.

FIELD OF INVENTION

The present disclosure relates generally to gaming machines, and particularly to playing a gaming of chance on a gaming machine. More particularly, the present disclosure relates to using a portable electronic device to play a game of chance on a gaming machine.

BACKGROUND OF THE INVENTION

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic device may be configured to be updated so as allow for the presentation of additional multimedia services or applications. Portable electronic devices may also be configured to have wireless transmission and receiving capabilities so as to permit communication with one or more other sources.

Gaming machines may comprise any number of peripheral devices associated with the act of playing a game of chance. For example, peripheral devices such as a display, bill acceptor, keypad, ticket printer, and user input switches may be used to play a game of chance. Gaming establishments are always looking for new ways and/or gaming options to attract players to increase profits. However, presenting new services on gaming machines may be costly, time-consuming, and generally undesirable for many casinos owners for numerous reasons such as regulatory requirements, maintenance, and the like.

SUMMARY

A system, method, and apparatus for communicating information between a gaming machine and a portable electronic device using a peripheral management device are described.

In one embodiment, a gaming machine is able to be augmented by a remote peripheral device. The remote peripheral device can wirelessly communicate with the gaming machine. For example, a portable computing device, such as a mobile phone, tablet computer, personal digital assistant, and the like, can function as an external peripheral device for the gaming machine. As a result, the gaming environment for a game of chance played on the gaming machine can be extended (at least in part) to a player's portable computing device. Such a gaming environment allows the portable computing device to serve as one or more of a display, input device, storage device, and the like.

In another embodiment, a peripheral management device may be used as an intermediary device between the gaming machine and the remote peripheral device to allow a player to play a game of chance on the gaming machine. The peripheral management device may receive peripheral bound data and be configured to determine where to transmit the peripheral bound data. In other words, the peripheral management device may be configured to determine whether to transmit the peripheral bound data to a remote virtual peripheral device on the portable electronic device or to local peripheral devices on the gaming machine.

In another embodiment, a system for communicating information between a gaming machine and a portable electronic device can use a peripheral management device. In one embodiment, a peripheral management device may have a controller configured to communicate with a gaming machine and a portable electronic device. The controller may be configured to: (i) receive a peripheral data packet from a gaming machine processor, the peripheral data packet including at least one command; (ii) determine whether to process the peripheral data packet on at least one peripheral device of the gaming machine or at least one virtual peripheral device of the portable electronic device; (iii) generate an instructional data packet for the at least one virtual peripheral device if the peripheral data packet is determined to be processed on the at least one virtual peripheral device; and (iv) transmit the instructional data packet to the portable electronic device.

In another embodiment, a system for communicating information between a gaming machine and a portable electronic device may have: (i) a gaming machine including at least one gaming machine processor, the at least one gaming machine processor configured to communicate with at least one of a plurality of peripheral devices on the gaming machine; (ii) a portable electronic device including at least one controller, the at least one controller configured to control at least one virtual peripheral device of the portable electronic device; and (iii) a peripheral controller configured to communicate with the gaming machine and the portable electronic device. The peripheral controller may be configured to receive a peripheral data packet from the gaming machine processor, the peripheral data packet including at least one command, determine whether to process the peripheral data packet on the least one peripheral device or the at least one virtual peripheral device, generate an instructional data packet for the at least one virtual peripheral device if the peripheral data packet is determined to be processed on the at least one virtual peripheral device, and transmit the instructional data packet to the portable electronic device.

The above and other features will be presented in more detail in the following detailed description and the associated figures. Other aspects and advantages will become apparent from the following detailed description, taken in conjunction with the accompanying drawings.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

FIGS. 7A-7J illustrate example graphical user interfaces of a portable electronic device used to communicate with a gaming machine.

FIGS. 11A-11D illustrate example graphical user interfaces of a portable electronic device.

DESCRIPTION

Figure 1:
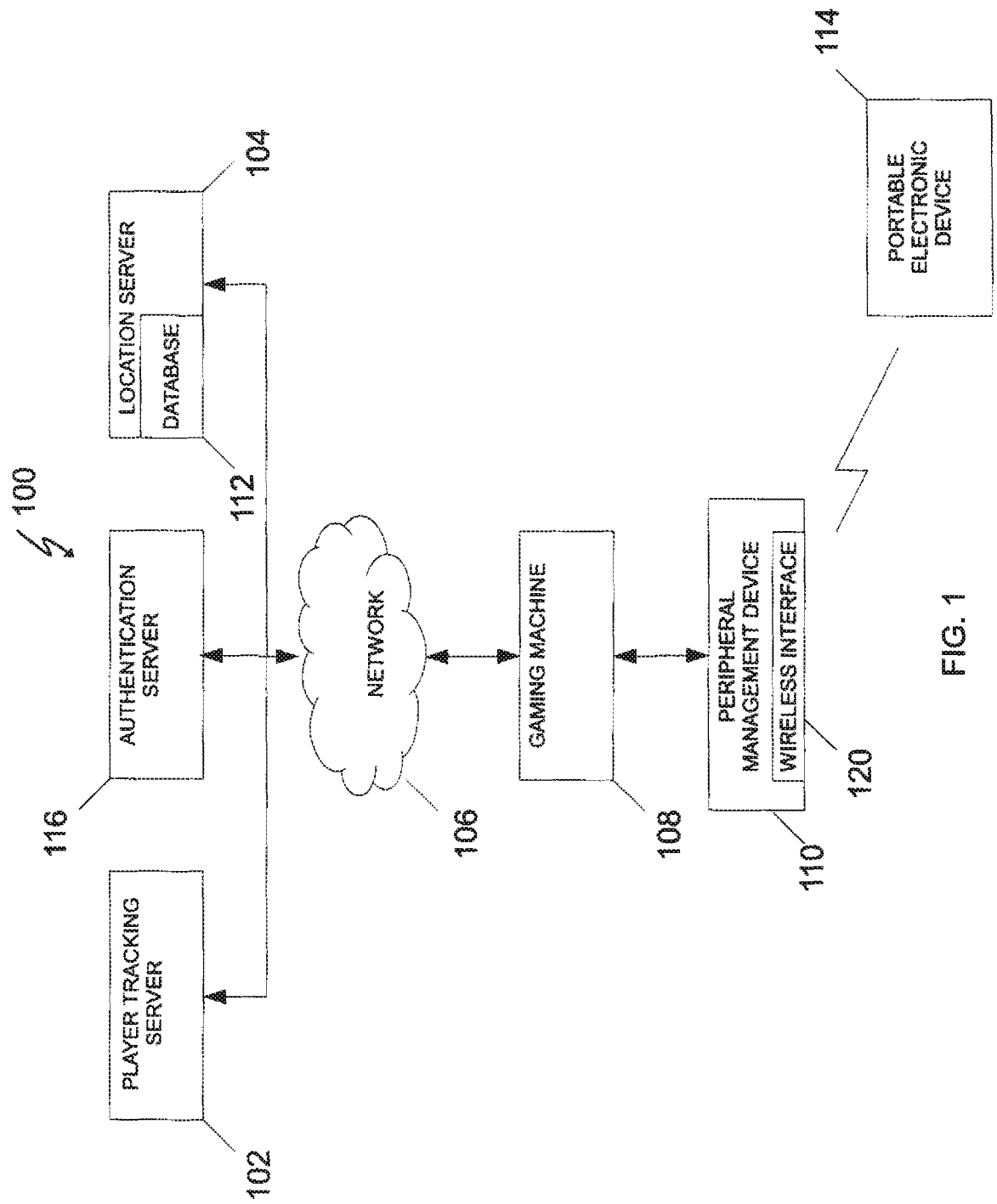
FIG. 1 illustrates one embodiment of a gaming system.

Embodiments are described herein in the context of a peripheral management device for virtual game interaction. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one or more embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A system, method, and apparatus for communicating information between a gaming machine and a portable electronic device using a peripheral management device are described. In one embodiment, a gaming machine is able to be augmented by a remote peripheral device. The remote peripheral device can wirelessly communicate with the gaming machine. For example, a portable computing device, such as a mobile phone, tablet computer, personal digital assistant, and the like, can function as an external peripheral device for the gaming machine. As a result, the gaming environment for a game of chance played on the gaming machine can be extended (at least in part) to a player's portable computing device. Such a gaming environment allows the portable computing device to serve as one or more of a display, input device, storage device, and the like.

In another embodiment, a peripheral management device may be used as an intermediary device between the gaming machine and the remote peripheral device to allow a player to play a game of chance on the gaming machine. The peripheral management device may receive peripheral bound data and be configured to determine where to transmit the peripheral bound data. In other words, the peripheral management device may be configured to determine whether to transmit the peripheral bound data to a remote virtual peripheral device on the portable electronic device or to local peripheral devices on the gaming machine.

In use, many players desire to play on multiple machines. However, the gaming machines must be neighboring machines such as a machine to the right and/or left of the player since the player must be near in order to press the input buttons and/or switches, insert money, and perform any other gaming function. By using a remote peripheral device, such as a portable electronic device, to play a gaming of chance on a gaming machine, the player may have the freedom to play other gaming machines and not just gaming machines neighboring the gaming machine the player desires to play. For example, the player may want to play a game of chance on gaming machine A as well as gaming machine B. However, gaming machine B may be four gaming machines away from gaming machine A. Thus, by using the remote peripheral device to play the gaming of chance on gaming machine A, the player can also play the gaming of chance on gaming machine B. This provides a player the freedom to play a game of chance on any gaming machine without having any physical limitations.

FIG. 1 illustrates one embodiment of a gaming system. System 100 includes at least one gaming machine 108 having a peripheral management device 110. Gaming machine 108 may be configured to communicate with a plurality of servers such as a player tracking server 102, authentication server 116, and a location server 104 via network 106. Although illustrated with three servers, this is not intended to be limiting as gaming machine 108 may be configured to communicate with any number of servers via network 106 such as an awards server, accounting server, financial server, games server, and the like. The gaming machine 108 may be connected to network 106 via any wired or wireless methods such as universal serial bus, Ethernet, Serial Advanced Technology Attachment (SATA), 3rd Generation ("3G") wireless technology, 4th Generation ("4G") wireless technology, Fire Wire, Worldwide Interoperability for Microwave Access ("WiMax"), IEEE 802.11 technology, Near-Field Magnetic Network, radio frequency, and the like.

Gaming machine 108 may be configured to also communicate with peripheral management device 110 via any wired or wireless methods. Peripheral management device 110 may have a wireless interface 120 configured to communicate with a portable computing device or a portable electronic device 114. Peripheral management device 110 may be used as an intermediary device between the gaming machine 108 and the portable electronic device 114 to allow a player to play a game of chance on the gaming machine 108. The peripheral management device 110 may receive peripheral bound data (from the portable electronic device 114 and/or the gaming machine 108) and determine where to transmit the peripheral bound data. In other words, the peripheral management device 110 may be configured to determine whether to transmit the peripheral bound data to a remote virtual peripheral device on the portable electronic device 114 or to local peripheral devices on the gaming machine 108.

The peripheral management device 110 allows the gaming machine 108 to be augmented by a remote peripheral device, such as the portable electronic device 114. The remote peripheral device 114 can wirelessly communicate with the gaming machine 108. For example, a portable computing device 114, such as a mobile phone, can function as an external peripheral device for the gaming machine 108. As a result, the gaming environment for a game of chance played on the gaming machine 108 can be extended (at least in part) to a player's portable computing device 114. Such a gaming environment allows the portable computing device 114 to serve as one or more of a display, input device, storage device, and the like.

Portable electronic device 114 may be configured to communicate with gaming machine 108 via peripheral management device 110 to play a game of chance on the gaming machine. In one embodiment, portable electronic device 114 may communicate with peripheral management device 100 via wireless interface 120. Wireless interface may be any known wireless methods or device such as a 3G wireless technology, 4G wireless technology, Bluetooth, Wireless USB, Near-field magnetic, Fire Wire, WiMax, IEEE 802.11 technology, radio frequency, and the like.

Figure 2:
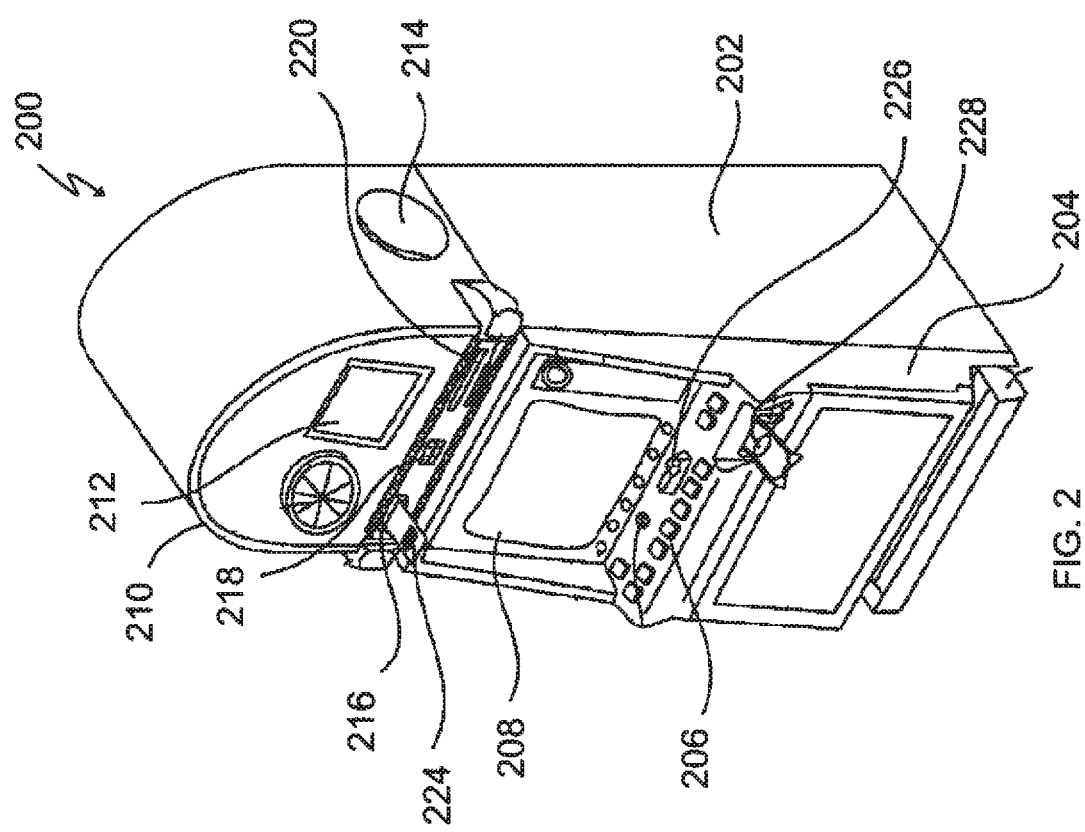
FIG. 2 illustrates a perspective view of an example gaming machine.

In use, the portable electronic device 114 may receive a user input request. The request may be any type of request, such as a request to transfer funds, print a receipt or ticket, dim the display, lower the volume on the speaker, spin a reel, cash out, double down, and the like. The portable electronic device 114 may transmit the user request to the peripheral management device 110 via wireless interface 120. Peripheral management device 110 may process the request (e.g. parse the user request) to determine what local peripheral device on the gaming machine 108 the user would like to access. Each remote virtual peripheral device on the portable electronic device 114 may be associated with a peripheral device on the gaming machine 108. Thus, for example, if the user request includes a request to dim a virtual display, the peripheral management device may determine that the virtual display is associated with the display (e.g. display 208 as illustrated in FIG. 2) on the gaming machine 108. As such, the user request may be processed to request access to the display on the gaming machine 108. In another example, the peripheral management device may parse the user request to determine that the user would like to lower the volume on the virtual speakers. The peripheral management device 110 may determine that the virtual speakers are associated with the speaker (e.g. speaker 214 illustrated in FIG. 2) on the gaming machine 108. Thus, the user request may be processed to request access to the speaker on the gaming machine 108.

The peripheral management device 110 may also modify, change, or edit the source and destination address of the user request. For example, the source address may be changed to the peripheral device associated with the virtual peripheral device and the destination address may be the gaming machine processor. Thus, the peripheral management device 110 may route the user request to a source destination as a local peripheral device. This permits for the seamless transfer of information or data to the gaming machine processor from the portable electronic device 114. In other words, peripheral management device acts as a context-sensitive smart router of data from a source device to a destination device, and is invisible to the gaming machine processor.

The processed funds transfer request may then be transmitted to the gaming machine 108. The gaming machine 108 may determine whether to transmit a command and/or an acknowledgement. For example, the gaming machine processor may determine that the user transferred a fund amount to play a game of chance on the gaming machine 108 which was received by the bill acceptor. The gaming machine 108 may then transmit commands and/or acknowledgements to at least one peripheral device of the gaming machine 108 to allow the user to play the game of chance. For example, the gaming machine 108 may transmit a command to the display to present the fund amount on the display. In another example, the gaming machine 108 may transmit an acknowledgment to the bill acceptor to display an acknowledgement message or fund amount on a display of the bill acceptor. In another embodiment, the gaming machine 108 may instruct the user input buttons or switches to activate and light up to indicate that the player may begin to play the game of chance.

The peripheral management device 110 may intercept the commands and/or acknowledgments from the gaming machine 108. The peripheral management device 110 may then process the intercepted commands and/or acknowledgements by parsing the commands and/or acknowledgement to determine where the commands and/or acknowledgments should be transmitted to. In other words, the peripheral management device 110 may process the intercepted commands and/or acknowledgements to determine which remote virtual peripheral device on the portable electronic device 114 the commands and/or acknowledgements should be transmitted to and to determine which local peripheral device on the gaming machine 108 the commands and/or acknowledgements should be transmitted to.

If the peripheral management device 110 determines that the commands and/or acknowledgements should be transmitted to the portable electronic device 114, then the commands and/or acknowledgements may be transmitted to the portable electronic device 114. For example, if the transmission is an acknowledgement acknowledging the transfer of funds, the peripheral management device 110 may determine that the acknowledgement may be transmitted to the portable electronic device 114 to inform the user of the successful transfer of funds. The acknowledgement may then be displayed on a display of the portable electronic device (e.g. display 1108 as illustrated in FIGS. 11A-11D).

If the peripheral management device 110 determines that the commands and/or acknowledgements should not be transmitted to the portable electronic device 114, the peripheral management device 110 may determine and identify whether the commands and/or acknowledgements may be transmitted to the at least one peripheral device on the gaming machine 108. For example, if the transmission is an acknowledgement acknowledging the transfer of funds, the peripheral management device 110 may determine that the acknowledgement may be transmitted to the user input buttons and/or switches. The user input buttons and/or switches of the gaming machine 108 may then light up to indicate to the player that he may play the game of chance. In another example, the peripheral management device 110 may determine that the acknowledgement may be transmitted to the display of the gaming machine 108 to indicate or display the amount of credits. Thus, if the peripheral management device 110 determines and identifies that the commands and/or acknowledgements should be transmitted to at least one peripheral device on the gaming machine 108, the commands and/or acknowledgements may be transmitted to the identified at least one peripheral device on the gaming machine 108.

In one embodiment, player tracking server 102 may be configured to collect player data as well as determine the location of a customer within a gaming environment. Player tracking sever 102 may have a database configured to store player tracking information such as name, games the player likes to play, accumulated and used points, number of wins and losses, and the like. Player tracking server 102 may also be configured to store the location of all gaming machines within the gaming environment such that if a player inputs their player tracking card in a gaming machine, the player's gaming activities as well as the location of the player may be tracked.

In another embodiment, if the player is an anonymous player, location server 104, may be used to locate the location of the player in the gaming environment. Location server 104 may include a database containing the location of all gaming devices (stationary and mobile gaming devices) in the gaming environment. Furthermore, location server 104 may be configured to locate players within the gaming environment using any known wireless location methods such as global positioning systems (GPS), indoor WiFi triangulations, and the like. In one embodiment, location server 104 may be configured to locate the position of the player using the player's portable electronic device 114 and the location of the nearest gaming machine 108. In another embodiment, the location server 104 may be configured to locate the player in the gaming environment using only the player's portable electronic device 114.

The authentication sever 116 may be configured to authenticate or verify the player, gaming machine, and/or a portable electronic device via any known authentication means such as passwords and identification, biometric signatures, encryption keys, and the like. For example, to authenticate the player, the authentication server 116 may be configured to receive a username and password inputted via a player tracking keyboard (illustrated in FIG. 2B) on the gaming machine 108. The authentication server 116 may then compare the received username and password to a saved username and password stored in the authentication server 118. If the received and saved username and password are the same, then the player is authenticated.

FIG. 2 illustrates a perspective view of an example gaming machine. The gaming machine 200 may include a main cabinet 202. The main cabinet 202 may include a main door 204, which may be configured to open to provide access to the interior of the gaming machine. The main door 204 may have a plurality of peripheral devices. The plurality of peripheral devices may include at least one button or switch 206 configured to receive player input or command, a monitor 208, a secondary display 212, speaker 214, a ticket printer 216, a keypad 218 for entering player tracking information, a player tracking device 220, a coin acceptor 226, and a bill acceptor 228. The gaming machine 200 may be configured to display a game of chance on monitor 208 and/or secondary display 212. The game of chance may be any game of chance, including but not limited to, video poker, video blackjack, video keno, video slot games, and any other theme.

Player inputs may be detected from the at least one button or switch 206. When selected, the gaming machine may detect the input and transmit the input to the gaming machine processor. For example, the button 206 may be used to increase or decrease a betting amount. In another embodiment, monitor 208 may be a touch screen display such that the user may input selections via display 208. Monitor 208 may be, for example, one of a cathode ray tube, high resolution flat-panel liquid crystal display ("LCD"), a plasma display, a light-emitting diode ("LED") display, or any other monitor and/or display configured to present information and/or allow the user to play a game of chance. The video display monitor 208 may include one or more display windows to allow for multiple games or multiple services to be provided simultaneously to a user.

The top box 210 may be designed to house a plurality of peripheral devices, including but not limited to the secondary display 212 and speakers 214. During certain gaming events, the gaming machine 200 may be configured to display a plurality of visual and auditory effects that are perceivable by the user. Such visual effects may be displayed via the video display monitor 208 and the secondary display 212. The plurality of auditory and visual effects may serve to enhance the user's experience during game play. The secondary display 212 may be, for example, a cathode ray tube, high resolution flat-panel LCD, a plasma display, an LED display, or any other monitor and/or display configured to present information and/or allow the user to play a game of chance. The secondary display 212 may be configured to present a bonus game, services, video player, tournaments, move times, or any other information. Audio effects may be presented via the speakers 214.

The main door 204 may include the ticket printer 216 configured to print an electronically-readable ticket 224, keypad 218 for entering player tracking information, the player tracking device 220, the coin tray 222, the coin acceptor 226, and the bill acceptor 228. Following a completion of a gaming session, the ticket printer 216 may be configured to print an electronically-readable ticket 224. The electronically-readable ticket 224 provides one means of dispensing currency to the player when they are ready to "cash out". The electronically-readable ticket 224 may also include information relating to the gaming session, including a cash-out amount, a validation number, a gaming venue, a print date and time, gaming machine identification (ID) number, or any other relevant content.

The surface of the electronically-readable ticket 224 may also include a bar code. When the electronically-readable ticket 224 is inserted into a gaming machine, the bar code may be read and processed by another gaming machine so as to derive relevant content related to a prior gaming session. The electronically-readable ticket 224 may be either accepted by the bill acceptor 228 so as to add previously accumulated credits of another gaming machine to the existing credits or the electronically-readable ticket 224 may be exchanged for cash. The bill acceptor 228 may be configured to accept cash of a variety of currency or denomination as well as an electronically-readable ticket 224 having a cash value.

The secondary display 210, the keypad 218, and the player tracking device 220 may, in conjunction, comprise a player tracking service to provide for the accurate recording of information obtained during the gaming session. The player tracking service may display information relevant to the player's preferences as based on the recorded information on the secondary display 210. The player tracking service may be initiated when a magnetic striped card containing player tracking information is inserted into the player tracking device 220 and a personal identification number (PIN) is entered using the keypad 218. During the player tracking session, commands made by the player may be recorded such as in a memory (e.g. non-volatile random access memory (NVRAM), dynamic random access memory (DRAM)) on the gaming machine, player tracking server, or in any other data storage device. For example, during the player tracking session, the player tracking software may monitor the amount of time and activity that the player spends at a particular gaming machine, derive timely and accurate marketing information, and subsequently present commercialization opportunities based on that player's gaming preferences.

Figure 3:
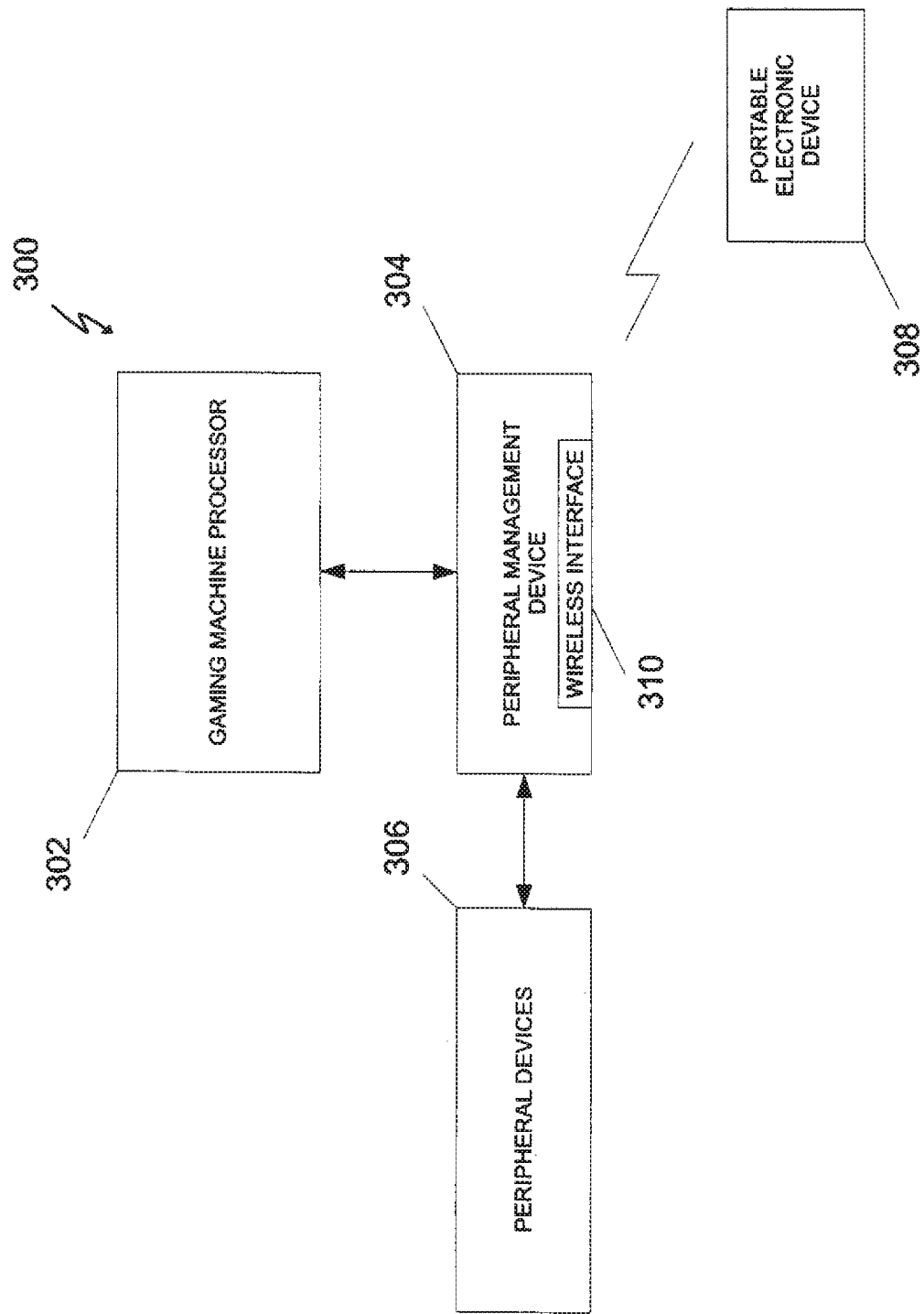
FIG. 3 illustrates an example block diagram of a gaming machine.

FIG. 3 illustrates an example block diagram of a gaming machine. The gaming machine 300 may have a gaming machine processor 302 configured to communicate with a peripheral management device 304 via any wired or wireless method and/or device. Peripheral management device 304 may be configured to communicate with portable electronic device 308 and each of the plurality of peripheral devices 306. Peripheral management device 304 may be configured to communicate with portable electronic device 308 via wireless interface 310 as discussed above. The plurality of peripheral devices 306 may be any peripheral device as discussed above with reference to FIG. 2. For example, the at least one button or switch 206, monitor 208, secondary display 212, speaker 214, ticket printer 216, keypad 218 for entering player tracking information, a player tracking device 220, a coin acceptor 226, and bill acceptor 228 may be peripheral device 306. Although illustrated with specific peripheral devices, this is not intended to be limiting as any other peripheral devices may be used on a gaming machine, such as an informational display, camera, microphone, accelerometer, touchscreen, and the like.

Figure 4:
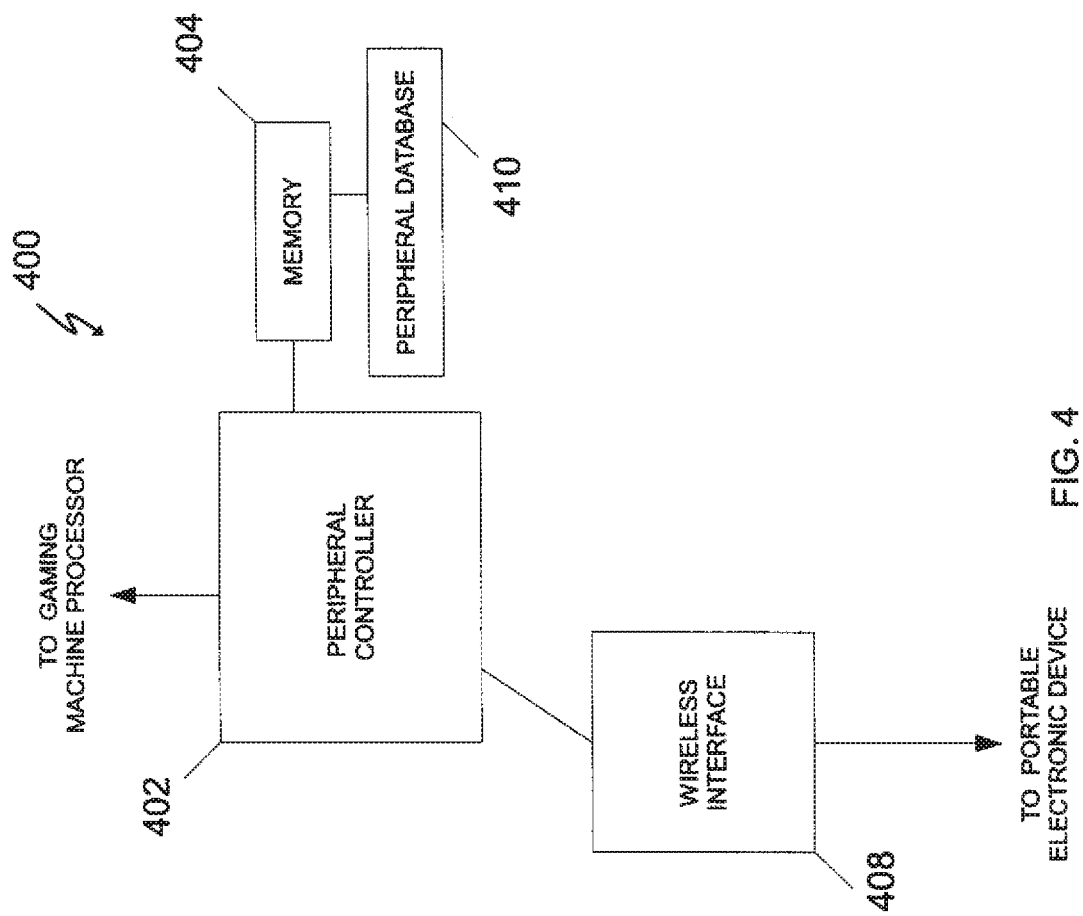
FIG. 4 illustrates an exemplary block diagram of a peripheral management device.

FIG. 4 illustrates an exemplary block diagram of a peripheral management device. Peripheral management device 400 may include a peripheral controller 402 configured to communicate with memory 404 and a wireless module 408. Wireless interface 408 may be configured to transmit and receive instructional data packets or peripheral bound data. Wireless interface 408 may be any module capable of wireless transmission such as 3G wireless technology, 4G wireless technology, Bluetooth, wireless universal serial bus (USB), wireless Ultra-wideband (UWB), WiMAX, near field communication, radio frequency, and the like. In one embodiment, wireless communication module 408 may be configured to transmit and receive peripheral bound data and/or information to and from a portable electronic device as well as a gaming machine processor.

Peripheral management device may be used as an intermediary device between the gaming machine and the remote peripheral device to allow a player to play a game of chance on the gaming machine. The peripheral management device may receive peripheral bound data (from the portable electronic device and/or the gaming machine processor) and determine where to transmit the peripheral bound data. In other words, the peripheral management device may be configured to determine whether to transmit the peripheral bound data to a remote virtual peripheral device on the portable electronic device or to local peripheral devices on the gaming machine.

The peripheral management device allows the gaming machine to be augmented by a remote peripheral device, such as the portable electronic device. The remote peripheral device can wirelessly communicate with the gaming machine. For example, a portable computing device, such as a mobile phone, can function as an external peripheral device for the gaming machine. As a result, the gaming environment for a game of chance played on the gaming machine can be extended (at least in part) to a player's portable computing device. Such a gaming environment allows the portable computing device to serve as one or more of a display, input device, storage device, and the like.

Memory 404 may be type of memory capable of storing data. Memory 408 may be any type of memory such as DRAM, NVRAM, and the like. Memory may have a peripheral database 410 configured to store peripheral device information. In one embodiment, the peripheral database 410 may store a table associating the remote virtual peripheral device on the portable electronic device to the local peripheral devices on the gaming machine. For example, the peripheral database 410 may associate the virtual "Cash Out" button of the portable electronic device to the "Cash Out" button on the gaming machine. In another embodiment, the peripheral database 410 may associate the virtual "Deal" button of the portable electronic device to the "Deal" button on the gaming machine.

In another embodiment, the peripheral database 410 may store a table associating a request or command from the portable electronic device to a local peripheral device on the gaming machine. For example, a request to transfer money from the portable electronic device may be associated with the bill acceptor of the gaming machine. In another example, a request to end a game session from the portable electronic device may be associated with a "Cash Out" button on the gaming machine.

Figure 5:
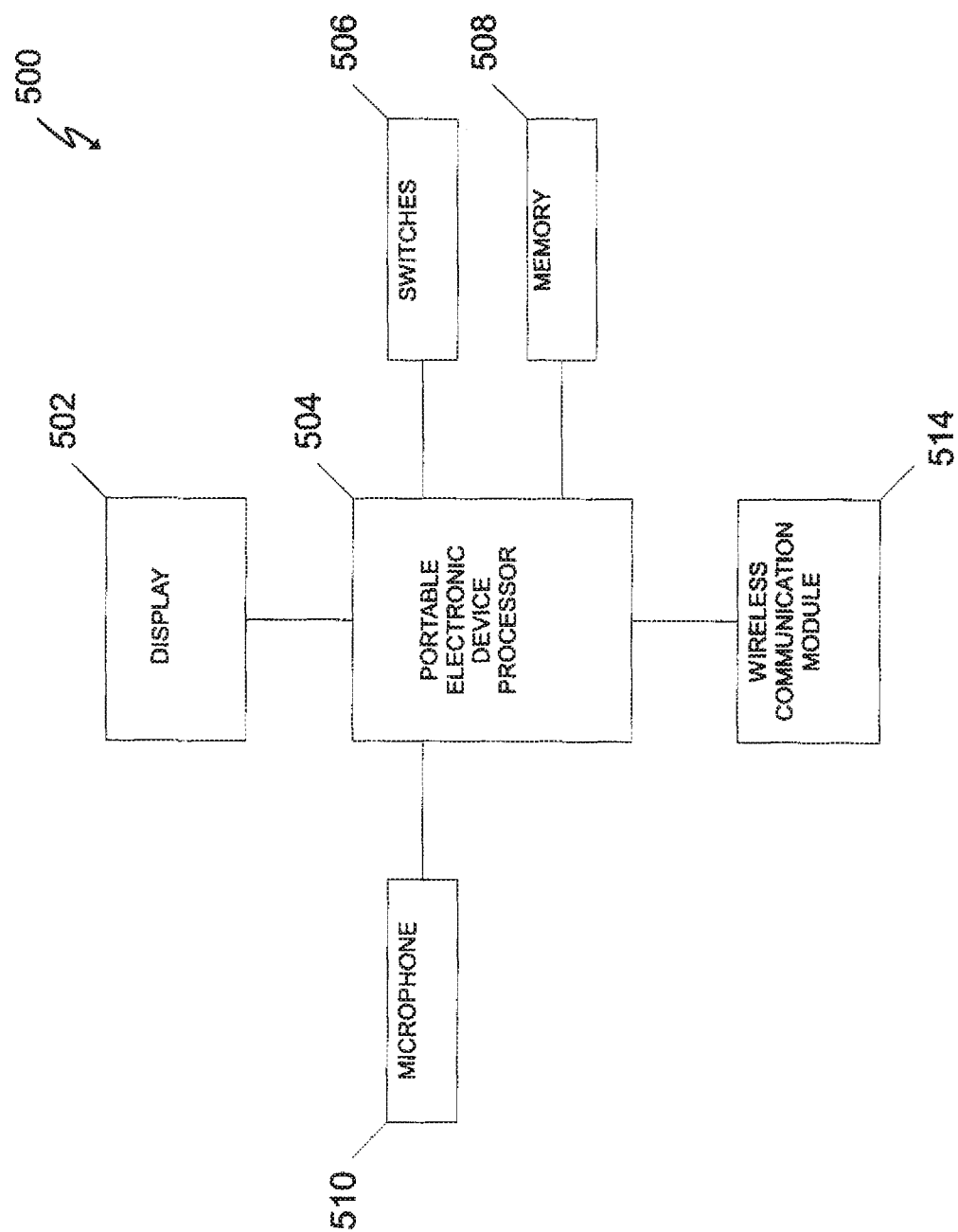
FIG. 5 illustrates an example block diagram of a portable electronic device.

FIG. 5 illustrates an example block diagram of a portable electronic device. The portable electronic device 500 may be any type of portable computing device. For example, portable electronic device 500 may be a cellular phone, portable media player, personal digital assistant (PDA), netbook, portable computer, electronic reader, and the like. Portable electronic device 500 may have a processor 504, display 502, memory 508, at least one user button or switch 506, microphone 510 configured to receive audio input, and a wireless communication module 514. Although illustrated with specific components, this is not intended to be limiting as portable electronic device 500 may have other components such as an antenna, power source, speaker, camera, and the like.

Display 502 may be any type of display such as a touch screen display, LCD, plasma display, LED display, or any other monitor and/or display configured to present information and/or allow the user to play a game of chance. For example, display 502 may be configured to display a plurality of indicators (as discussed and illustrated in, for example, FIGS. 7, 11, and 13). In one embodiment, display 502 may include a touch screen sensor such that the processor may be configured to detect a user selection of at least one of the indicators. In another embodiment, processor may be configured to detect a user selection of at least one of the indicators from switches 506.

Each indicator may correspond to a virtual peripheral device, which may be associated with a peripheral device on the gaming machine. For example, user selection of the "Cash Out" indicator may be associated with a virtual cash out button on the portable electronic device, which may be associated with the "Cash Out" button on the gaming machine. In another embodiment a "Spin Reel" indicator may be associated with a virtual spin button on the portable electronic device, which may be associated with the "Spin" button on the gaming machine.

Portable electronic device 500 may have a memory 508 configured to store any type of information, data, and/or software to play a game of chance on a gaming machine and/or perform any other gaming functions such as checking a player tracking account, transferring funds to play the game of chance, and the like. Memory 508 may be any type of memory such as DRAM, NVRAM, Ferroelectric Random Access Memory (FRAM), Electrically Erasable Programmable Read-Only Memory (E2PROM), and the like.

Wireless communication module 514 may be configured to transmit and receive instructional data packets or peripheral bound data. Wireless communication module 514 may be any module capable of wireless transmission such as 3G wireless technology, 4G wireless technology, Bluetooth, wireless USB, wireless UWB), WiMAX, near field communication, radio frequency, and the like. In one embodiment, wireless communication module 514 may be configured to transmit and receive peripheral bound data and/or information to and from peripheral management device (e.g. peripheral management device 110 illustrated in FIG. 1).

Figure 6:
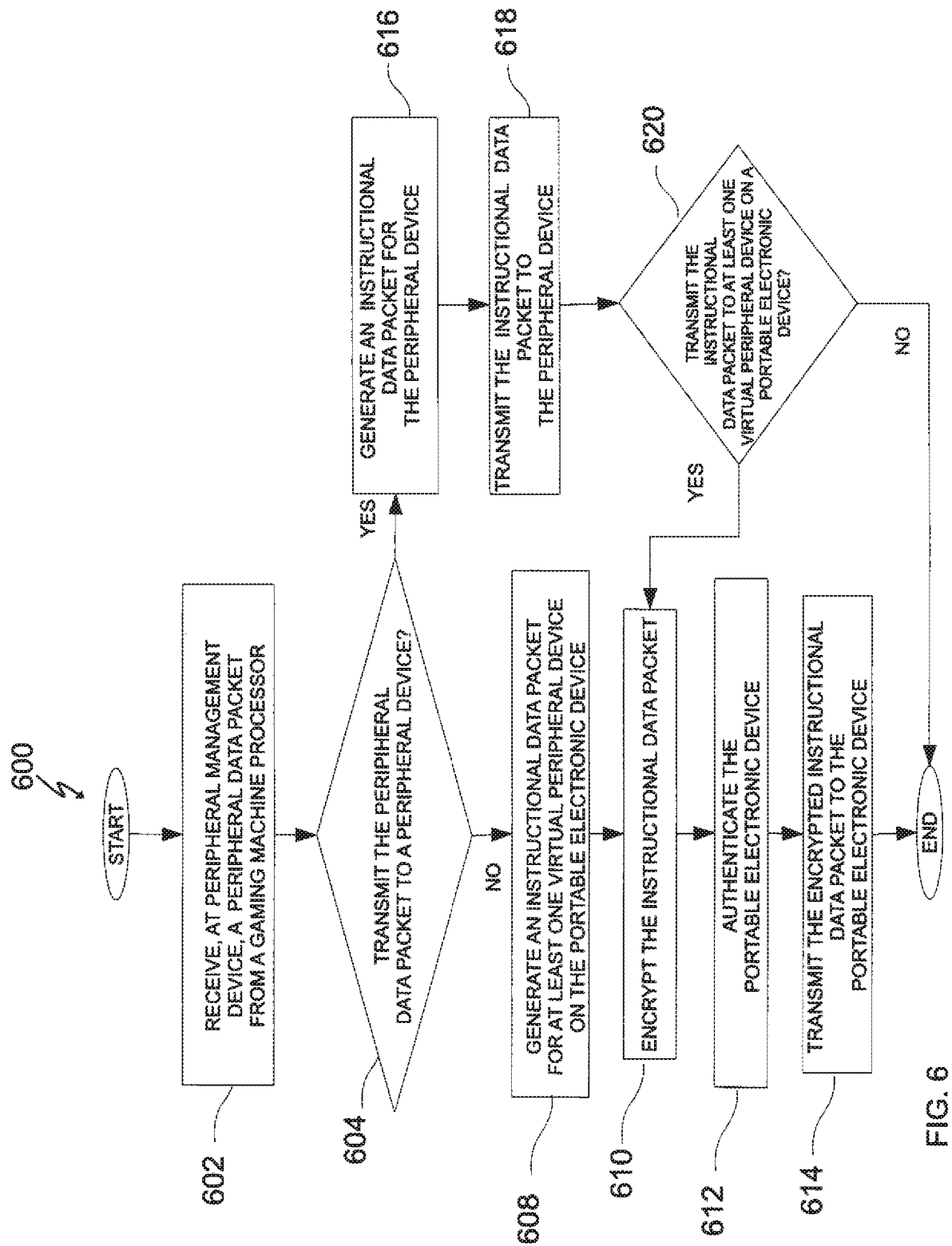
FIG. 6 illustrates an example flow diagram of a method for communicating information and/or data between a gaming machine and a portable electronic device.

FIG. 6 illustrates an example flow diagram of a method for communicating information and/or data between a gaming machine and a portable electronic device. The method 600 begins with the peripheral management device receiving a peripheral data packet from a gaming machine processor at 602. The peripheral data packet may include at least one command and/or acknowledgement. In one embodiment, the peripheral data packet may include at least one command and/or acknowledgement for at least one peripheral device of the gaming machine. For example, the peripheral data packet may include a command for the display (e.g. display 208, 212 as illustrated in FIG. 2) to display a credit amount which can allow the user to play a game of chance on the gaming machine. In another embodiment, the peripheral data packet may include a command for the user input buttons and/or switches (e.g. input buttons and/or switches 206 as illustrated in FIG. 2) to light up. In still another embodiment, the peripheral data packet may also include other data such as a source address, destination address, and user identification data such as a portable electronic device identifier, user password, user PIN, and the like. The portable electronic device identifier may be any set of words or numbers that are unique to the portable electronic device.

The peripheral management device may determine whether to transmit the peripheral data packet to at least one peripheral device of the gaming machine at 604. The peripheral management device may parse the peripheral data packet to determine or identify which peripheral device(s) the peripheral data packet should be transmitted to. In one embodiment, the peripheral management device may identify which peripheral device the peripheral data packet should be transmitted to by the destination address. In another embodiment, the peripheral management device may identify which peripheral device the peripheral data packet should be transmitted to by the command. For example, the command may be to indicate the amount of credits. Thus, the peripheral management device may determine that the amount of credits is to be displayed on the display of the gaming machine.

If the peripheral management device determines that the peripheral data packet should be transmitted to the peripheral device at 604, an instructional data packet may be generated for the at least one peripheral device of the gaming machine at 616. The instructional data packet may include the at least one command and/or acknowledgement from the gaming machine. In one embodiment, the instructional data packet may also include other data such as a source address, destination address, and any other identifying information such as a gaming machine identifier to identify the gaming machine.

The instructional data packet may be transmitted to the at least one peripheral device at 618. The peripheral management device may transmit the instructional data packet to the identified at least one peripheral devices. The peripheral management device may determine which of the at least one peripheral devices to transmit the instructional data packet to via the destination address, command, or any other identifying criteria in the peripheral data packet.

The peripheral management device may then determine whether to transmit the instructional data packet to at least one virtual peripheral device on a portable electronic device at 620. For example, if the peripheral data packet included an acknowledgement for the receipt of funds received by the player, the peripheral management device may determine that the acknowledgement should be transmitted to the virtual display of the portable electronic device to inform the player that the transfer of funds (as discussed with reference to FIGS. 10 and 11A-11D) was successful. In another example, if the peripheral management device determines that the peripheral data packet included a command for the user input buttons and/or switches to light up, the peripheral management device may determine not to transmit the instructional data packet to the portable electronic device at 620. In still another example, if the peripheral management device determines that the peripheral data packet included a command for the user input buttons and/or switches to light up, the peripheral management device may determine to still transmit the instructional data packet to the virtual user buttons or switches on the portable electronic device at 620.

If the peripheral management device determines not to transmit the peripheral data packet to at least one peripheral device of the gaming machine at 604, an instructional data packet may be generated for at least one virtual peripheral device on the portable electronic device at 608. The instructional data packet may include the at least one command and/or acknowledgement from the gaming machine. In one embodiment, the instructional data packet may also include other data such as a source address (e.g. gaming machine, peripheral management device, and the like), destination address (e.g. portable electronic device), and user identification data such as a portable electronic device identifier, user password, user PIN, and the like. The portable electronic device identifier may be any set of words or numbers that are unique to the portable electronic device.

The instructional data packet may be encrypted at 610. The instructional data packet may be generated at 608 and/or 616. The instructional data packet may be encrypted using any known encryption method such as Advanced Encryption Standard (AES), Message Authentication Code (MAC), Hash based Message Authentication Code (HMAC), SHA-2, and the like.

The portable electronic device may then be authenticated at 612 to ensure that the instructional data packet is transmitted to the proper portable electronic device. Any known authentication methods may be used such as authentication algorithms, random number generators, authentication keys, and the like. In one embodiment, the peripheral management device may request user information (e.g. portable electronic device identifier, password, PIN, and the like) from the portable electronic device. The peripheral management device may then authenticate the portable electronic device by comparing or matching the requested user information with user information in the peripheral data packet. The portable electronic device may be authenticated if the requested user information matches the user information in the peripheral data packet. Once authenticated, the encrypted instructional data packet may be transmitted to the authenticated portable electronic device at 614 via any known wired or wireless methods or devices such as a universal serial bus, Ethernet, SATA, Fire Wire, 3G wireless technology, 4G wireless technology, Bluetooth, wireless USB, wireless UWB, WiMAX, near field communication, radio frequency, and the like.

Figure 7A:
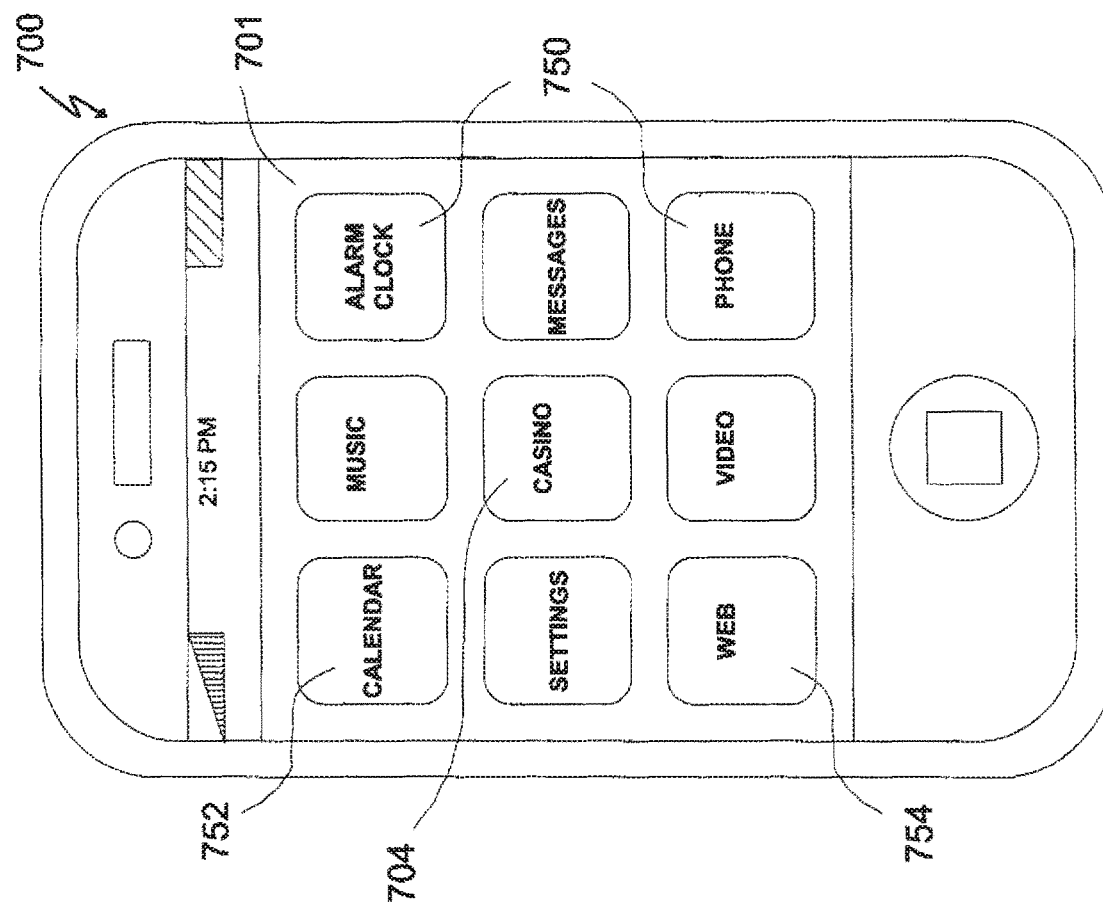

FIGS. 7A-7J illustrate example graphical user interfaces of a portable electronic device used to communicate with a gaming machine. FIG. 7A illustrates one embodiment of the graphical user interface of the portable electronic device 700. The portable electronic device 700 may be configured to display at least one indicator 750 on a display 701 of the portable electronic device 700. The indicators 705 may be any type of indicator configured to receive a user input command. Additionally, the display may be any type of known display such as a touch screen display, LCD, plasma display, LED display, or any other monitor and/or display configured to present information and/or allow the user to play a game of chance.

For example, if the user would like to look at a calendar, the user may press the "Calendar" indicator 752. The portable electronic device 700 may detect the user selection of the "Calendar" indicator 752 and display a calendar on the display 701. In another example, the user may want to access the Internet. Thus, the user may press the "Web" indicator 754. The portable electronic device 700 may detect the user selection of the "Web" indicator 754 and display a search engine on the display 701. In still another example, the player may want to play a game of chance on a gaming machine. Thus, the user may press the "Connect To Gaming Machine" indicator 766. The portable electronic device 700 may detect the user selection of the "Connect To Gaming Machine" indicator 766 and display a game menu as illustrated in FIG. 7J.

Figure 7B:
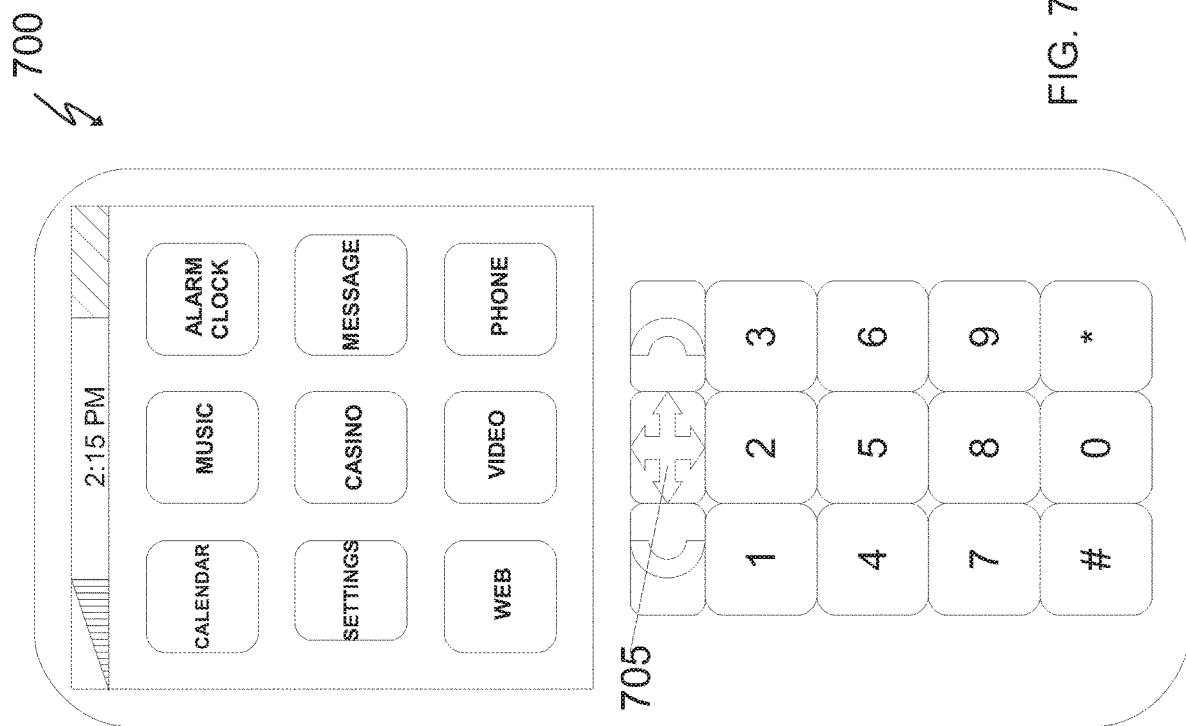

FIG. 7B illustrates another embodiment of the graphical user interface of the portable electronic device 700. If display 701 is not a touch screen display, at least one user input buttons or switches 705 may be used to navigate the graphical user interface. For example, a user may select or navigate the at least one of the indicators by using the at least one user input buttons or switches 705 to move a cursor (or any other similar type of indicator) right, left, up, or down on the display. However, the use of the illustrated user input buttons or switches 705 is for exemplary purposes and not intended to be limiting as any type of device to navigate a graphical user interface may be used such as a keyboard, joystick, and the like.

Figure 7D:
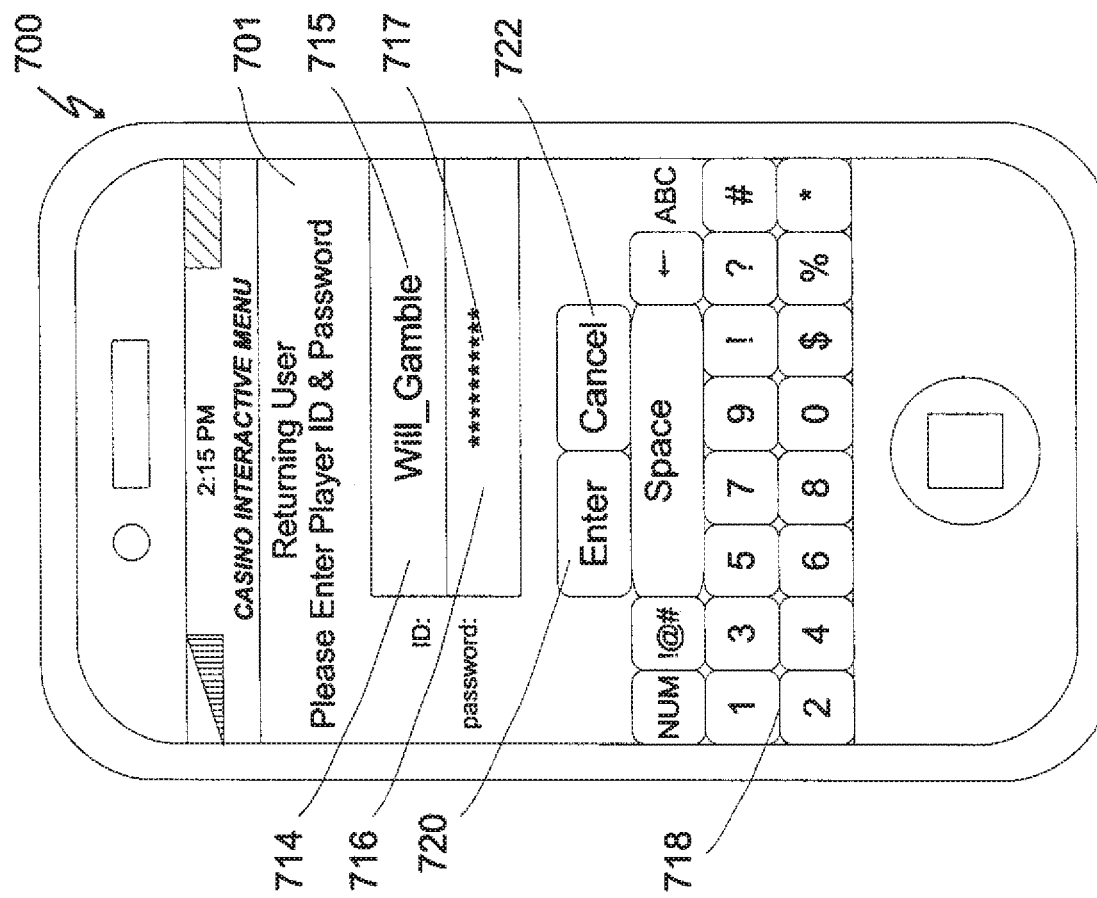
Figure 7E:
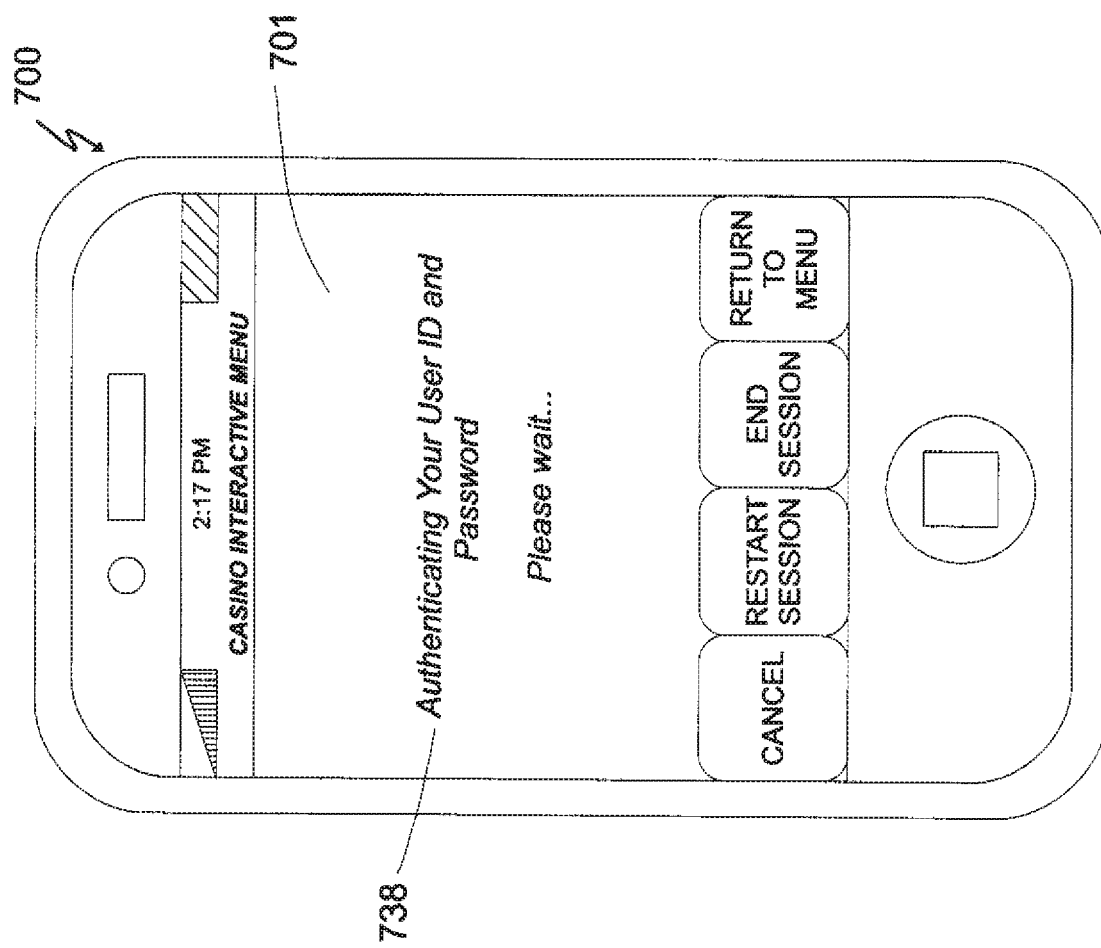

FIG. 7C illustrates one example of the graphical user interface presenting a welcome screen. The welcome screen 707 may display any type of welcome message (e.g. using text, images, designs, audio, and the like) to the user. This provides for a friendly and welcoming gaming environment for the players. The display 701 may also present a "Returning User" 708 indicator and a "New User" indicator 710. Thus, if the user has an existing player tracking account with the casino, then the "Returning User" indicator 708 may be selected. If the user does not have an existing account with the casino then the "New User" indicator 710 may be selected. If the "Returning User" indicator 708 is selected, then the graphical user interface may be updated to present a returning user login screen as illustrated in FIG. 7D. Alternatively, if the "New User" indicator 710 is selected, then the graphical user interface may be updated to present an account set up screen as illustrated in FIG. 7G.

Referring now to FIG. 7D, if the user is a returning user that has an existing player tracking account with the casino and the portable electronic device 700 detected that the "Returning User" indicator 708 was selected, the graphical user interface may be updated to present a login screen on the display 701. In one embodiment, the login screen may be configured to display one or more user-enterable fields. By way of example, the one or more user-enterable fields may include a user ID box 714 and a password box 716. A keyboard 718 may also be presented on the display 701. The keyboard 718 may be configured to assist the user with inputting a unique username in the user ID box 714 and a password in the password box 716. As illustrated, the unique username 715 illustrated in FIG. 7D is "Will_Gamble" 715. Additionally, although the password 717 is illustrated as not displayed, this is not intended to be limiting as the password may be displayed to the user.

After the user ID box 714 and the password box 716 have both received a username 715 and password 717, respectively, the user may select to confirm or enter the username 715 and password 717 by pressing the "Enter" indicator 720 or cancel the entered username 715 and password 717 by pressing the "Cancel" indicator 722. By pressing the "Cancel" indicator 722, the portable electronic device 700 may remove the contents of the user-enterable fields. In other words, pressing the "Cancel" indicator 722 may result in the removal of the username 715 in the user ID box 714 and password 717 in the password box 716.

By pressing the "Enter" indicator 720, the user's password and ID may be transmitted from the portable electronic device 700 to the peripheral management device (e.g. peripheral management device 110 (FIG. 1), 304 (FIG. 3), 400 (FIG. 4)) for processing. Once transmitted to the peripheral management device, the display 701 may indicate to the user that the user identification and password is being authenticated as illustrated in FIG. 7E. For example, the portable electronic device 700 may display an "Authenticating Your User ID and Password" message 738 on the display 701.

Figure 7F:
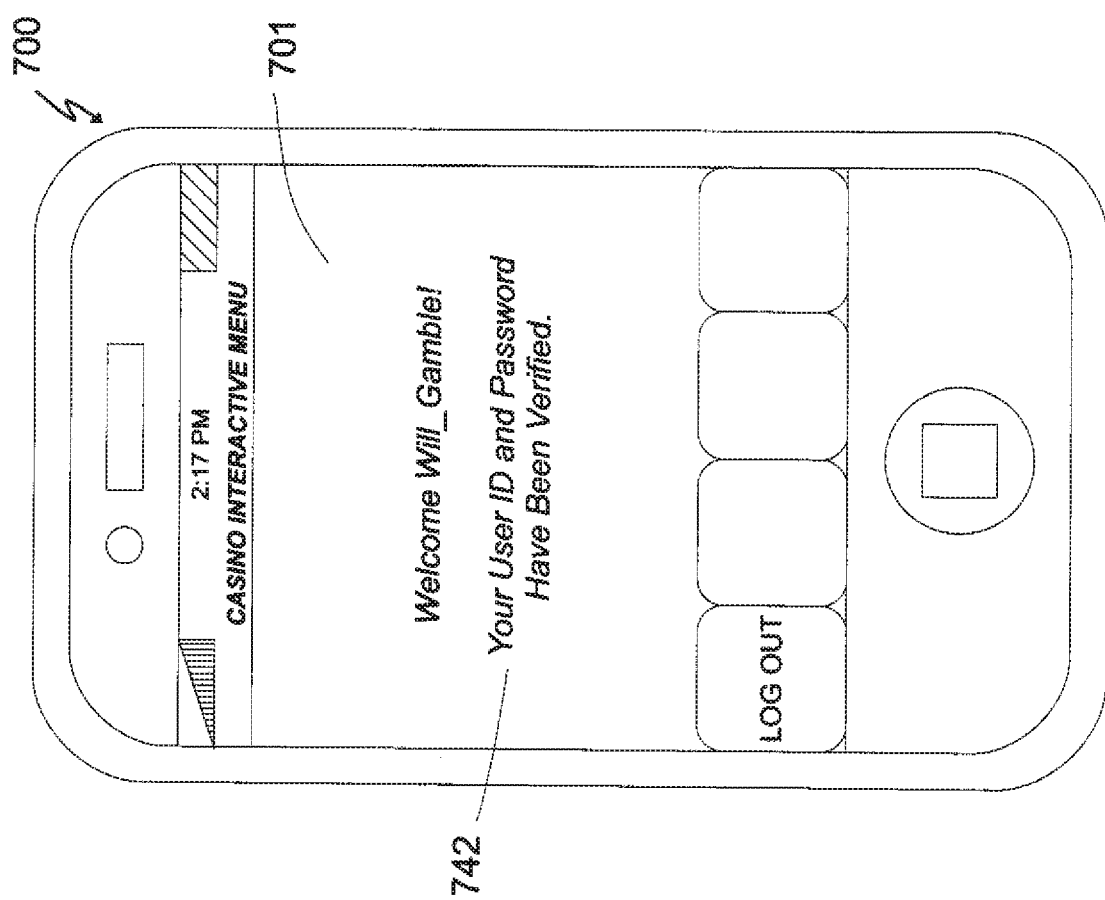
Figure 7G:
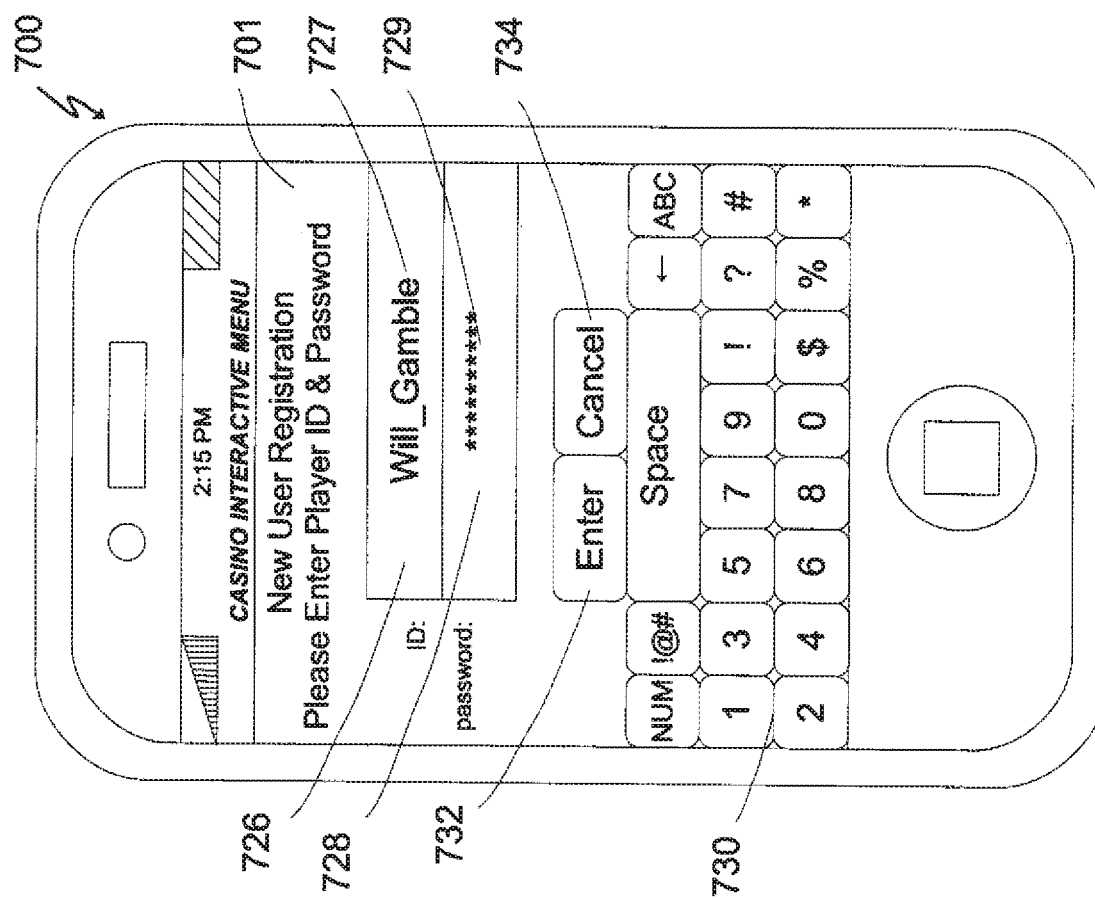

Referring to FIG. 7F, if the user's password and ID are authenticated (as described in detail with reference to FIG. 8), the portable electronic device may display a successful message on the display 701. As illustrated, a message 742 such as "Welcome Will_Gamble! Your User ID and Password Have Been Verified" 742 may be displayed on display 701.

If the user does not have an existing account at the gaming establishment, the user may be prompted to set up an account. FIG. 7G illustrates one example of the graphical user interface of an account setup screen 724. The account setup screen may be configured to display one or more user-enterable fields 726, 728. By way of example, the account setup screen 724 may have a user ID box 726 and a password box 728 for the user to input personal information to set up a player tracking account. The graphical user interface may also present an alphabetical/numerical keyboard 730 configured to assist a user to input a unique ID or username in the user ID box 726 and a password in the password box 728. As illustrated, the unique username 727 is "Will_Gamble" 715.

After the user ID box 726 and the password box 728 have both received an ID or username 727 and password 729, respectively, the user may select to confirm or enter the username 727 and password 729 by pressing the "Enter" indicator 732 or cancel the entered username 727 and password 729 by pressing the "Cancel" indicator 734. By pressing the "Cancel" indicator 734, the portable electronic device 700 may remove the contents of the user-enterable fields. In other words, pressing the "Cancel" indicator 734 may result in the removal of the username 727 in the user ID box 726 and password 729 in the password box 728.

Figure 7H:
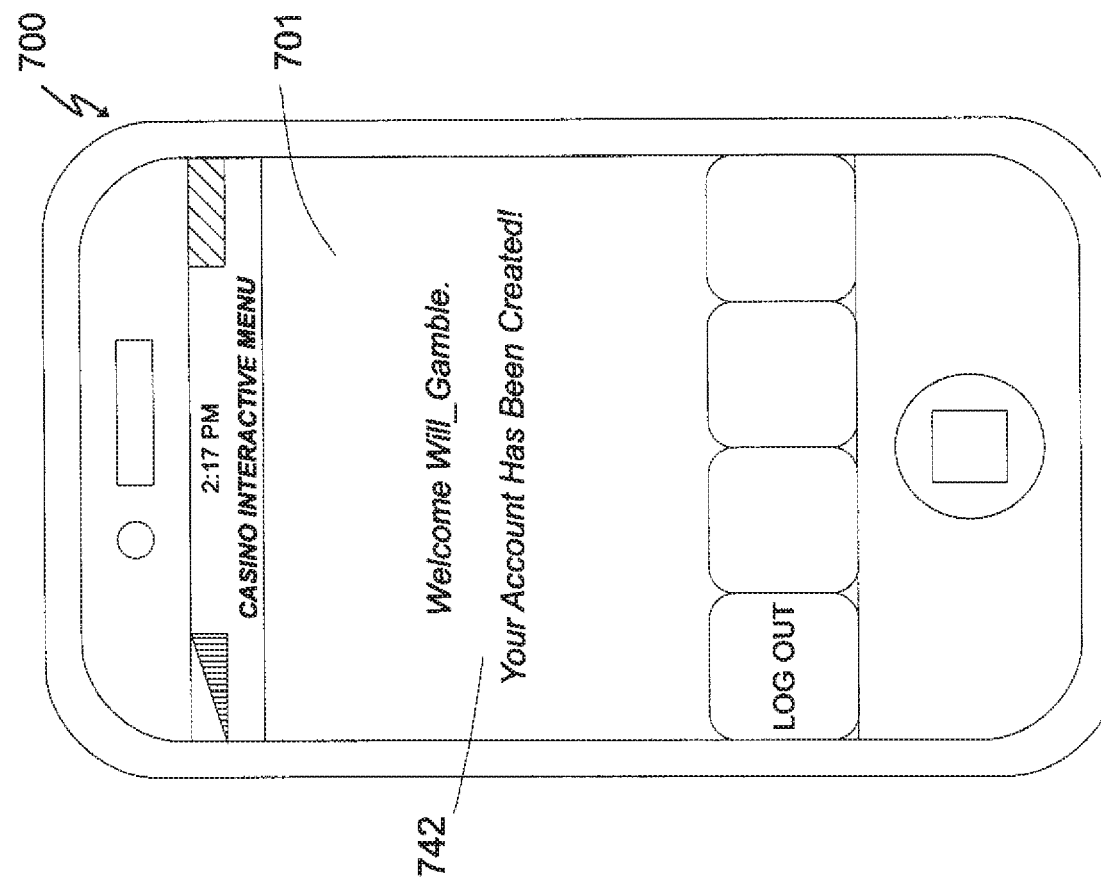
Figure 71:
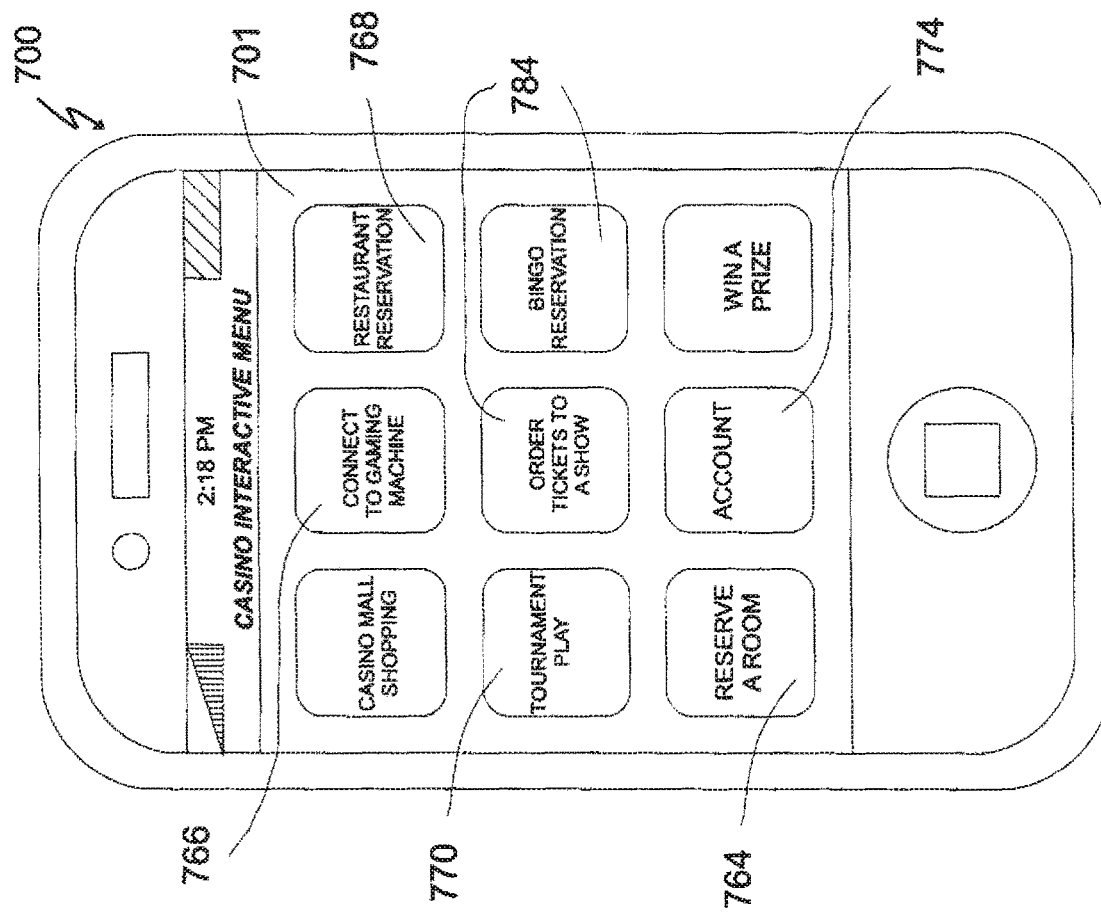
Figure 7J:
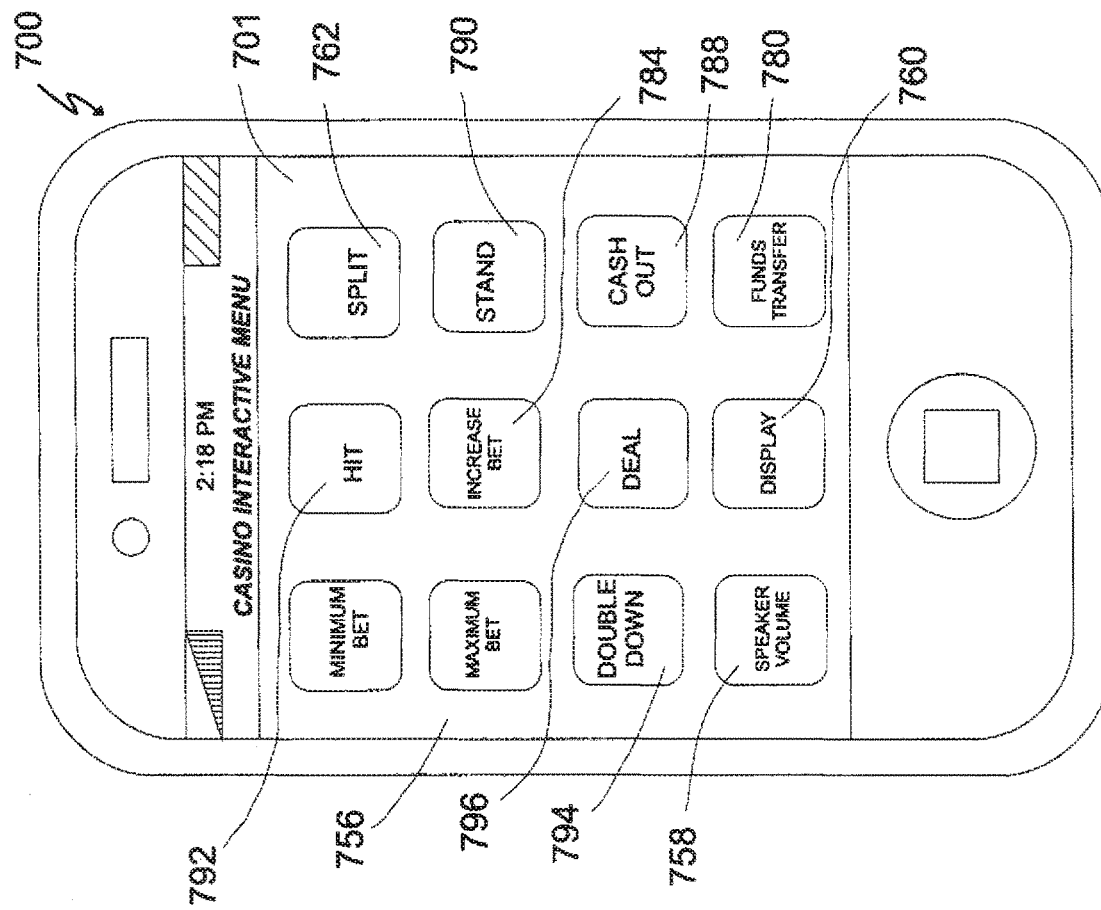

By pressing the "Enter" indicator 732, the user's password 729 and ID or username 727 may be transmitted from the portable electronic device 700 to the peripheral management device (e.g. peripheral management device 110 (FIG. 1), 304 (FIG. 3), 400 (FIG. 4)) for processing. Once a player tracking account has been created for the user, the portable electronic device 700 may present a successful message to the user as illustrated in FIG. 7H. The portable electronic device 700 may present a message, for example, "Welcome Will_Gamble! Your Account Has Been Created!" 782. Although not illustrated, it will now be known that any other personal user information may be requested to create a player tracking account such as address, phone number, electronic mail address, emergency contact information, driver's license number, and the like.

FIG. 7I illustrates an example graphical user interface displaying a casino menu. The casino menu may be presented on the display 701 after successful authentication of the user and/or successful creation of a player tracking account. The display 701 may present a plurality of indicators 784. In one embodiment, each indicator may represent a service provided by the gaming establishment (e.g. a casino), such as reserving a room 764, playing in a tournament 770, restaurant reservations 768, and the like. In another embodiment, at least one indicator may connect the portable electronic device to a gaming machine 766 if the player would like to play a game of chance. In still another embodiment, the user may access his player tracking account by pressing the "Account" indicator 774. Although illustrated with specific indicators, this is for exemplary purposes only as other gaming establishment functions may be presented.

FIG. 7J illustrates an example graphical user interface displaying a gaming menu. If the user selects the "Connect To Gaming Machine" indicator 766 illustrated in FIG. 7I, the portable electronic device 700 may display a gaming menu 756. The gaming menu may have a plurality of gaming function indicators. As illustrated, the gaming function indicators may represent virtual user input buttons for a video blackjack game of chance. For example, the indicators may be "Stand" 790, "Hit" 792, "Double Down" 794, "Deal" 796, and the like. Each virtual user input button may be associated with or correspond to a peripheral device on the gaming machine. For example, the "Stand" indicator 790 may correspond to a virtual stand button on the portable electronic device 700, which in turn corresponds to the stand button on the gaming machine (not shown). Thus, if the user would like to stand on a dealt hand, the user may depress the "Stand" indicator 790 on the portable electronic device 700.

The indicators may also relate to other gaming functions. For example, a user may decrease or increase the volume on a gaming machine by pressing the "Speaker" indicator 758. In another embodiment, the user may adjust the brightness of the display by pressing the "Display" indicator 760. If the user would like to increase his bet, he may press the "Increase Bet" indicator 764. Although illustrated with specific indicators, this is for exemplary purposes only as other game play functions may be presented such as spinning a reel, decrease bet, and the like.

Figure 8:
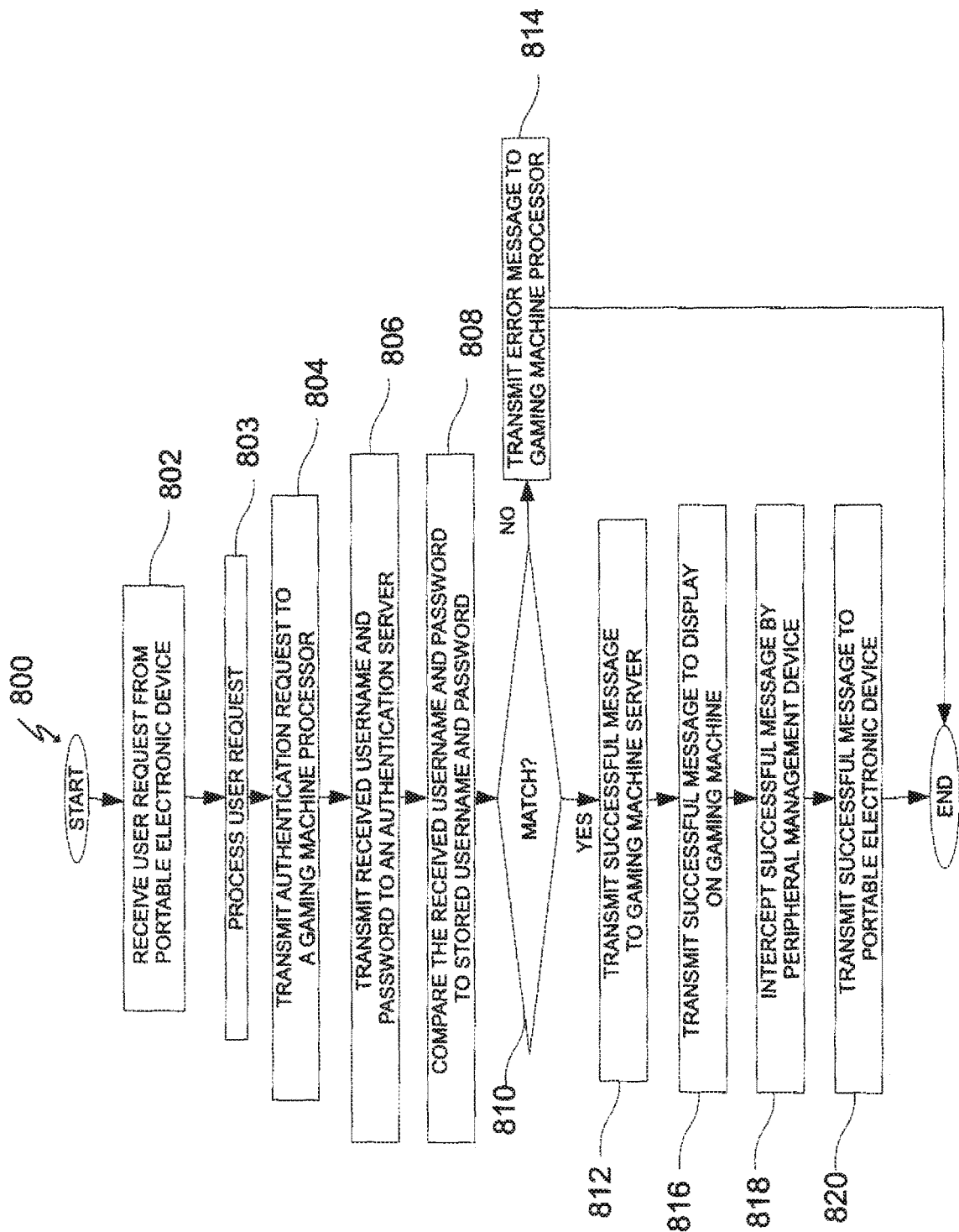
FIG. 8 illustrates a flow diagram of a method for authenticating a user in accordance with one embodiment.

FIG. 8 illustrates a flow diagram of a method for authenticating a user in accordance with one embodiment. The method 800 begins with the peripheral management device receiving a user request to access a gaming machine from a portable electronic device at 802. In one embodiment, the user request may include a username, password, and request to play a game of chance on the gaming machine. The gaming machine may be identified by any known methods such as infrared, unique gaming machine identification, bar code on the gaming machine, location information for the gaming machine, and the like. For example, the user may manually input the unique gaming machine identification in the portable electronic device, which may then be transmitted with the user request. In another embodiment, the user may scan a bar code on the gaming machine into the portable electronic device, which may be transmitted with the user request.

The peripheral management device may process the user request at 803. To process the user request, in one embodiment, the peripheral management device may parse the information in the user request such as the username, password, gaming machine identifier, and access request to determine that the user request needs to be authenticated. The peripheral management device may also change the source and destination address of the user request. For example, the source address may be changed to the peripheral device associated with the virtual peripheral device and the destination address may be the gaming machine processor. In other words, the peripheral management device may associate the user request with the virtual player tracking device, which may correspond to or be associated with the player tracking device on the gaming machine.

The peripheral management device may then transmit an authentication request to the gaming machine processor at 804. The authentication request may include a request to authenticate the player and include the username and password received from the portable electronic device. Additionally, since the source address may be changed, the gaming machine processor may believe that the request was transmitted from a peripheral device on the gaming machine and not from the peripheral management device or portable electronic device. Continuing with the example above, the gaming machine may believe that the authentication request resulted from player input at the player tracking device—i.e. that the player input the username and password using a keypad (e.g. keypad 218 as illustrated in FIG. 2) on the player tracking device. Thus, the gaming machine would not suspect that the user requested was transmitted from the portable electronic device.

The gaming machine processor may then transmit the username and password to the authentication server (e.g. authentication server 116 illustrated in FIG. 1) at 808. However, it will now be known that any server configured to authenticate and/or verify a user may be used, such as the player tracking server (e.g. player tracking server 102 illustrated in FIG. 1).

The authentication server may compare the received username and password to a previously submitted and/or saved username and password stored in a database of the authentication server at 808. If there is no match at 810, the authentication server may transmit an error message to the gaming machine processor at 814. If there is a match at 810, the authentication server may transmit a successful message to the gaming machine processor at 812. Although username and password credentials are illustrated in the authentication process, any other type of credentials or criteria maybe used. For example, biometrics such as facial features, fingerprints, voice prints, and the like, may be used.

In one embodiment, the gaming machine processor may transmit the successful message to a display on the gaming machine (e.g. display 208, 212 illustrated in FIG. 2) at 816. In another embodiment, the gaming machine processor may transmit the successful message to a display on the player tracking device (e.g. player tracking device 220 as illustrated in FIG. 2). Thus, the display used to inform the user that the authentication was successful is not intended to be limiting as any known means to transmit the information to the player may be used. The peripheral management device may intercept the successful message at 818 and transmit the successful message to the portable electronic device at 820. The successful message may be similar to the example graphical user interface illustrated in FIG. 7F.

Figure 9:
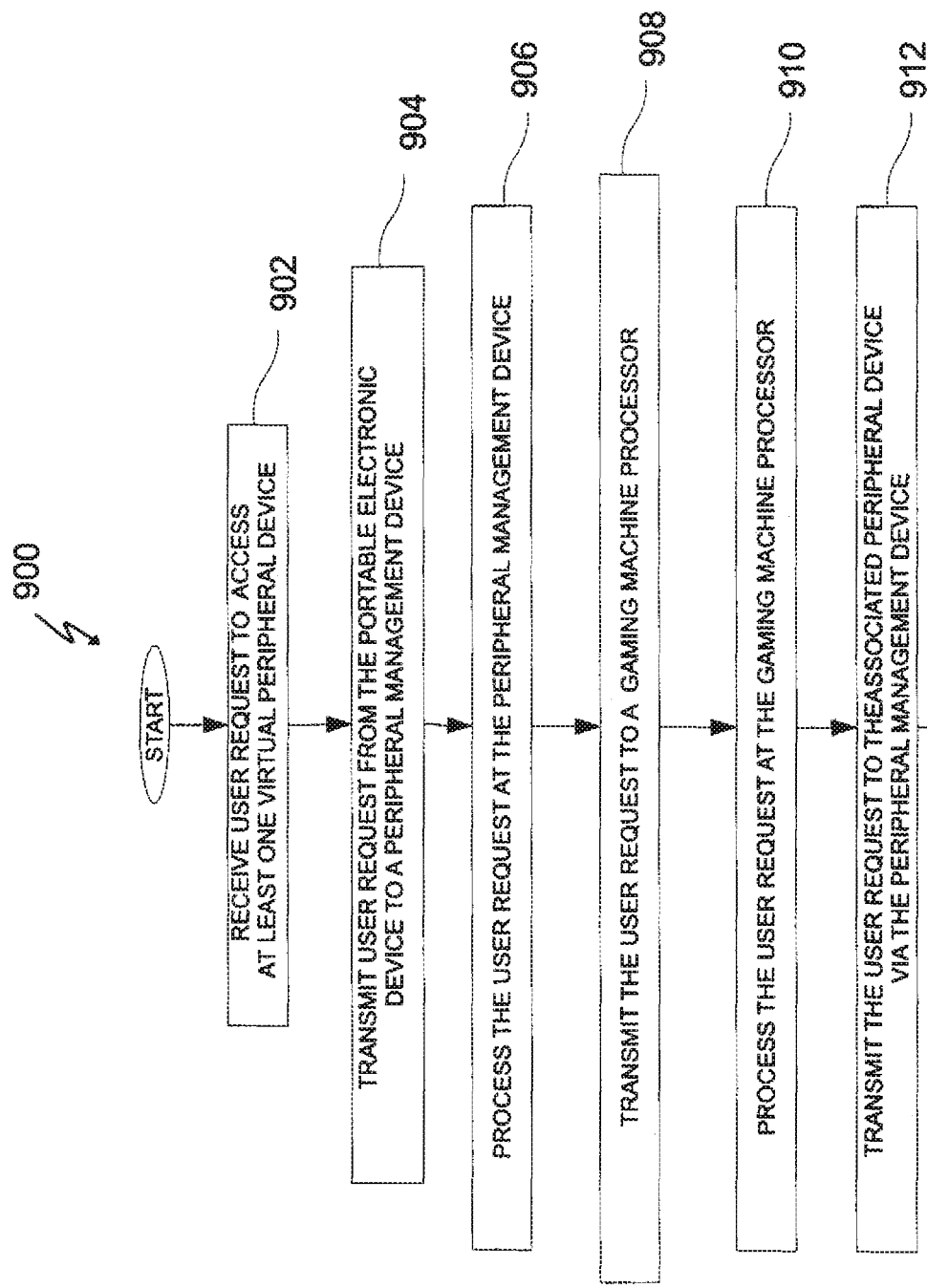
FIG. 9 illustrates an exemplary flow diagram of a method for communicating at least one user request to a gaming machine using a peripheral management device.

FIG. 9 illustrates an exemplary flow diagram of a method for communicating at least one user request to a gaming machine using a peripheral management device. The method 900 may begin by receiving, at or by the portable electronic device, a user request to access at least one virtual peripheral device at 902. The portable electronic device may generate the user request based upon user selection of an indicator. The indicators may be similar to, for example, the indicators illustrated in FIG. 7J. For example, the indicators may be a request to spin a reel, bet the minimum bet, decrease the volume in the speaker, dim the display, and the like.

The user request may then be transmitted from the portable electronic device to a peripheral management device at 904. The user request may be transmitted by any know wired or wireless means such as universal serial bus, Ethernet, SATA, Fire Wire, 3G wires technology, 4G wireless technology, Fire Wire, Bluetooth, wireless USB, wireless UWB, WiMAX, near field communication, radio frequency, and the like. The peripheral management device may process the user request at 906. In other words, the peripheral management device may parse the user request to determine what peripheral device on the gaming machine the user would like to access. Each virtual peripheral device on the portable electronic device may be associated with a peripheral device on the gaming machine. Thus, for example, if the user request includes a request to dim a virtual display, the peripheral management device may determine that the virtual display is associated with the display (e.g. display 208 as illustrated in FIG. 2) on the gaming machine. As such, the user request may be processed to request access to the display on the gaming machine. In another example, the peripheral management device may parse the user request to determine that the user would like to lower the volume on the virtual speakers. The peripheral management device may determine that the virtual speakers are associated with the speaker (e.g. speaker 214 illustrated in FIG. 2) on the gaming machine. Thus, the user request may be processed to request access to the speaker on the gaming machine. In still another example, the peripheral management device may parse the user request to determine that the user would like stop playing the game of chance and selected the "Cash Out" indicator (e.g. "Cash Out" indicator 788). Thus, the peripheral management device may associate the virtual "Cash Out" indicator with the cash out button (e.g. button 206 illustrated in FIG. 2) of the gaming machine and the user request may be processed to indicate the user would like to redeem the remaining credits on the gaming machine.

The peripheral management device may also modify, change, or edit the source and destination address of the user request. For example, the source address may be changed to the peripheral device associated with the virtual peripheral device and the destination address may be the gaming machine processor. In other words, the peripheral management device may associate the user request with the virtual cash out button (i.e. "Cash Out" indicator 788 as illustrated in FIG. 7I), which may correspond to or be associated with the cash out button (e.g. buttons 206 as illustrated in FIG. 2) on the gaming machine.

Once the user request is processed at 906, the peripheral management device may transmit the processed user request to the gaming machine processor at 908. The gaming machine processor may process the user request at 910 to generate a command and/or acknowledgement. For example, if the user request included a request to dim the display, the gaming machine processor may process the processed user request to include a dim command to be transmitted to the display. In another example, if the user request included a request to lower the volume, the gaming machine processor may transmit the user request to include volume command to be transmitted to the speakers on the gaming machine. In still another example, if the user request included a request to cash out, the gaming machine processor may transmit a print ticket command to be transmitted to the printer.

The command and/or acknowledgment may be transmitted to the corresponding peripheral device via the peripheral management device at 912. For example, the print ticket command may be transmitted from the gaming machine processor to the printer on the gaming machine. In another example, the volume command may be transmitted from the gaming machine processor to the speaker on the gaming machine.

EXAMPLE 1

The following examples are intended to be for exemplary purposes only and not intended to be limiting as many other possibilities and uses are possible and contemplated.

Figure 10:
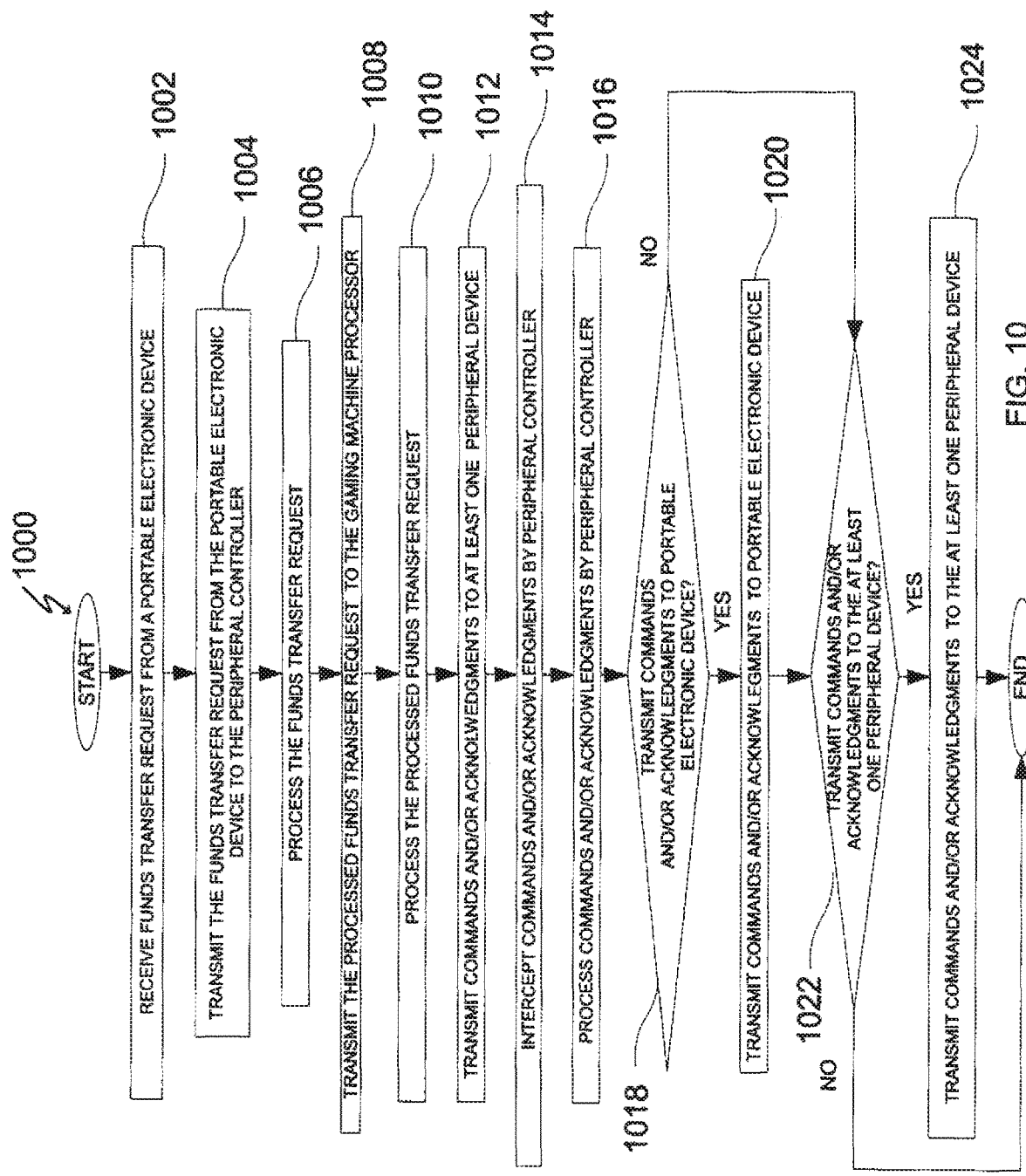
FIG. 10 illustrates an exemplary flow diagram of a method to transfer funds to a gaming machine from a portable electronic device.

FIG. 10 illustrates an exemplary flow diagram of a method to transfer funds to a gaming machine from a portable electronic device. The method 1000 may begin by the portable electronic device receiving at least one funds transfer request to transfer funds at 1002. The at least one funds transfer request may be requested by a user to permit the user to play a game of chance on a gaming machine. In one embodiment, the at least one funds transfer request may be physically initiated by the user pressing a "Funds Transfer" indicator (e.g. "Funds Transfer" indicator 780 illustrated in FIG. 7J) presented on a display of the portable electronic device. In another embodiment, the at least one funds transfer request may be an audio command. The audio command may be any audio command received and recognizable by the portable electronic device as an instruction or command to transfer funds. For example, the audio command may include words such as "money transfer", "funds transfer", "cash in", and the like.

The funds transfer request may be transmitted from the portable electronic device to the peripheral controller (e.g. peripheral controller 402 illustrated in FIG. 4) at 1004. In one embodiment, the funds transfer request may be encrypted by the portable electronic device prior to being transferred. Any known encryption methods may be used such as AES, MAC, HMAC, SHA-2 and the like. The funds transfer request may include any necessary information or data to facilitate the transfer of funds, such as a portable electronic device identifier, destination address (e.g. which gaming machine to transfer the funds to), amount of funds to be transferred, and the like.

The peripheral controller may process the at least one funds transfer request at 1006. The peripheral controller may process the at least one funds transfer request by parsing the information in the funds transfer request to determine which peripheral device, on the gaming machine, the user would like to access. Each virtual peripheral device on the portable electronic device may be associated with a peripheral device on the gaming machine. Thus, the peripheral controller may determine that the user would like to transfer a specific amount of funds to the gaming machine via the virtual bill acceptor, which may be associated with the bill acceptor on the gaming machine. The user request may then be processed as a request for the bill acceptor on the gaming machine. Additionally, processing the at least one funds transfer request may include modifying the funds transfer request to reflect the proper source address and destination address. For example, the funds transfer request may be modified to reflect the source address as the bill acceptor and the destination address as the gaming machine processor. This permits for the seamless transfer of information or data to the gaming machine processor from the portable electronic device. In other words, peripheral management device is invisible to the gaming machine processor.

The processed funds transfer request may then be transmitted to the gaming machine processor (e.g. gaming machine processor 302 as illustrated in FIG. 3) at 1008 for the gaming machine processor to process at 1010. For example, the gaming machine processor may determine that the user transferred the fund amount to play a game of chance which was received by the bill acceptor. The gaming machine processor may then transmit commands and/or acknowledgements to at least one peripheral device of the gaming machine at 1012 to allow the user to play the game of chance. For example, the gaming machine may transmit a command to the display to present the fund amount on the display. In another example, the gaming machine may transmit an acknowledgment to the bill acceptor to display an acknowledgement message or fund amount on a display of the bill acceptor. In another embodiment, the gaming machine may instruct the user input buttons or switches to activate and light up to indicate that the player may begin to play the game of chance.

The peripheral controller may intercept the commands and/or acknowledgments at 1014 and process the intercepted commands and/or acknowledgments at 1016. The peripheral controller may process the intercepted commands and/or acknowledgements by parsing the commands and/or acknowledgement to determine where the commands and/or acknowledgments should be transmitted to. In other words, the peripheral controller may process the intercepted commands and/or acknowledgements to determine which virtual peripheral device on the portable electronic device the commands and/or acknowledgements should be transmitted to and to determine which peripheral device on the gaming machine the commands and/or acknowledgements should be transmitted to.

If the peripheral controller determines that the commands and/or acknowledgements should be transmitted to the portable electronic device at 1018, then the commands and/or acknowledgements may be transmitted to the portable electronic device at 1020. For example, if the transmission is an acknowledgement acknowledging the transfer of funds, the peripheral controller may determine that the acknowledgement may be transmitted to the portable electronic device to inform the user of the successful transfer of funds. The acknowledgement may then be displayed on a display of the portable electronic device (e.g. display 1102 as illustrated in FIGS. 11A-11D).

If the peripheral controller determines that the commands and/or acknowledgements should not be transmitted to the portable electronic device at 1018 or subsequent to the transmission of the commands and/or acknowledgements to the portable electronic device at 1020, the peripheral controller may determine and identify whether the commands and/or acknowledgements may be transmitted to the at least one peripheral device on the gaming machine at 1022. For example, if the transmission is an acknowledgement acknowledging the transfer of funds, the peripheral controller may determine that the acknowledgement may be transmitted to the user input buttons and/or switches. The user input buttons and/or switches may then light up to indicate to the player that he may play the game of chance. In another example, the peripheral controller may determine that the acknowledgement may be transmitted to the display of the gaming machine to indicate or display the amount of credits. Thus, if the peripheral controller determines and identifies that the commands and/or acknowledgements should be transmitted to at least one peripheral device on the gaming machine at 1022, the commands and/or acknowledgements may be transmitted to the identified at least one peripheral device on the gaming machine at 1024.

Figure 11B:
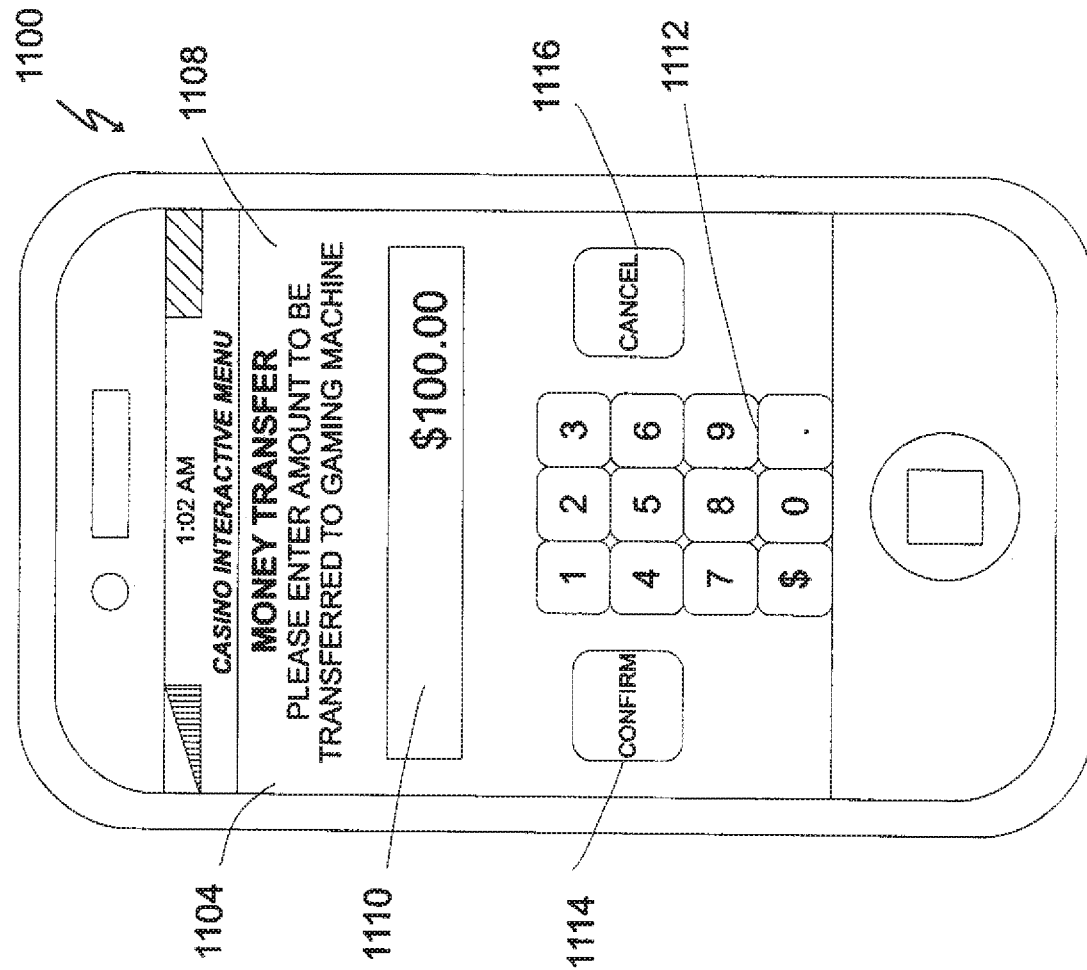

FIGS. 11A-11D illustrate example graphical user interfaces of a portable electronic device. FIG. 11A illustrates one example graphical user interface presenting gaming functions to play video black jack. The graphical user interface may have a plurality of indicators 1154 presented on a display 1102 of the portable electronic device 1100. Each plurality of indicator 1154 may represent any gaming function such as "Hit" 1150, "Stand" 1152, "Min. Bet" 1156, and the like. Although illustrated with specific game play functions, this is not intended to be limiting as any type of gaming function to play a game of chance on the gaming machine may be represented such as a "Play Bonus" indicator, "Spin Wheel" indicator, and the like. Each indicator may represent a virtual peripheral device that is associated with and/or corresponding to at least one peripheral device of the gaming machine. For example, the "Hit" indicator 1156 may be associated with a virtual "hit" button, which may be associated with a "Hit" button on the gaming machine. In another embodiment, the "Transfer Funds" indicator 1160 may correspond to a virtual bill acceptor, which may be associated with the bill acceptor on the gaming machine.

If the portable electronic device 1100 detects a user-selection of the "Transfer Funds" indicator, a funds transfer screen may be displayed on the display 1101 of the portable electronic device 1100 as illustrated in FIG. 11B. The portable electronic device 1100 may display a user-enterable field 1100 on display 1108. The user-enterable field 1100 may prompt the user to enter a fund amount, credit amount, or any other information necessary to complete a transfer of funds to the gaming machine. For example, the fund amount may be a specific monetary amount, such as 1100.00" as illustrated in FIG. 11B. In another example, the user may enter a credit amount, such as credit accumulated in his player tracking account. The user-enterable field 1100 may be populated using a numerical keypad 1112, joystick, or any other user-input buttons or switches.

In one embodiment, the user may obtain funds from a third party server using the portable electronic device 1100 prior to selection of the "Transfer Funds" indicator. For example, the user may request an advance of funds from a credit card server. In another embodiment, the user may request a debit from a bank account server. Any known methods to obtain funds are contemplated and may be used to obtain funds to play the game of chance on the gaming machine.

In one example, the user may confirm the amount inputted in the user-enterable field 1110 by selecting a "Confirm" indicator 1114. In another example, the user may cancel the selection by selecting the "Cancel" indicator 1116. Selecting the "Cancel" indicator 1116 may result in removal of the amounts entered in the user-selectable field 1110. On the other hand, selection of the "Confirm" indicator 1114 may result in the generation of a funds transfer request by the portable electronic device.

Figure 11C:
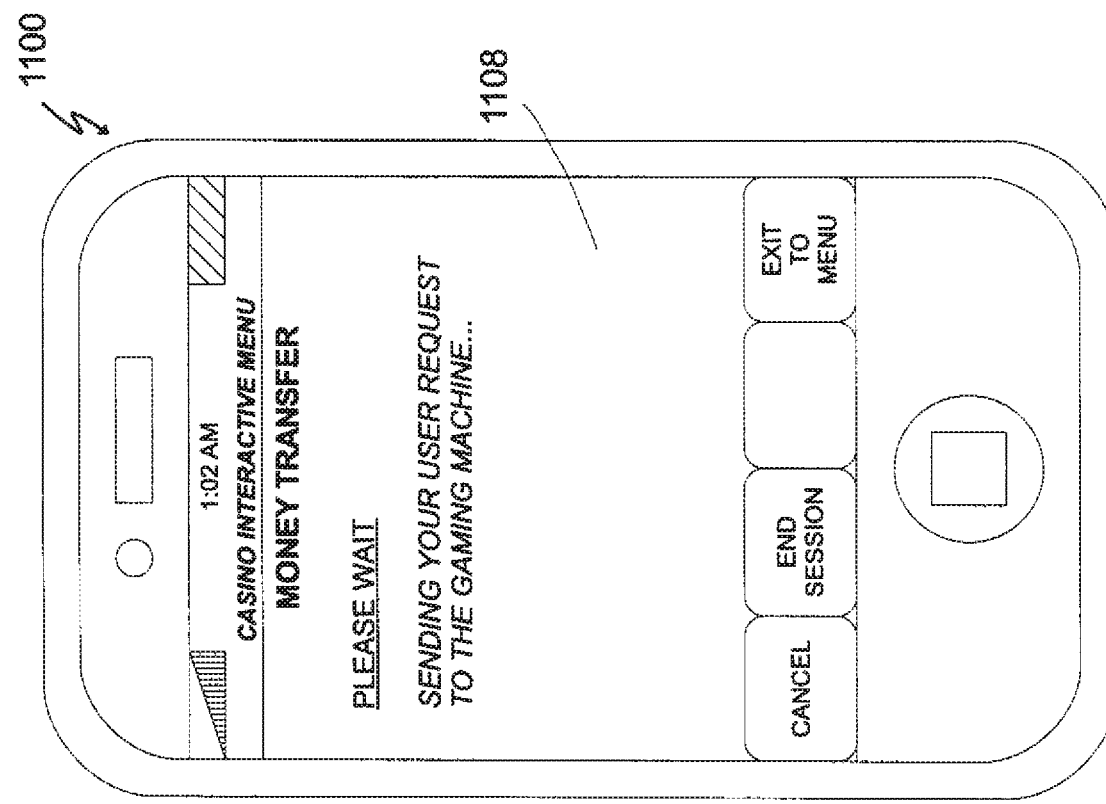

FIG. 11C illustrates an example graphical user interface indicating that the funds transfer request is processed and transmitted to the gaming machine. In one embodiment, as illustrated, a "Sending Your User Request To The Gaming Machine" message may be displayed on the display 1108 of the portable electronic device 1100 to inform the user of the transmission. The funds transfer request may include any information and requests to facilitate transfer of funds to the gaming machine. For example, the funds transfer request may include a unique user identification (ID), password, fund amount, funding source such as bank routing and checking account number and/or player tracking account number, and any other information or data necessary to facilitate the transfer of funds. In another embodiment, the funds transfer request may include location information of the portable electronic device (e.g. obtained from location server 104 illustrated in FIG. 1), location information of the gaming device (e.g. obtained from location server 104 illustrated in FIG. 1), time stamp data, and any other data or information that may be used to authenticate and/or verify the portable electronic device and the gaming device to ensure that the funds are transferred to the proper gaming device.

FIG. 11D illustrates an exemplary graphical user interface representing completion of the funds transfer. Upon receipt of the funds transfer request received from the portable electronic, the peripheral management device may process the funds transfer request. In other words, the peripheral management device may parse the funds transfer request to determine at least one of (i) the fund amount; (ii) the source of the funds; (iii) unique user ID and password; (iv) sufficient funds to transfer the fund amount; (v) gaming machine to transfer funds to, and any other necessary information to facilitate the transfer of funds to the gaming machine.

The peripheral controller may also process the at least one funds transfer request by parsing the information in the funds transfer request to determine which peripheral device, on the gaming machine, the user would like to access. Each virtual peripheral device on the portable electronic device may be associated with a peripheral device on the gaming machine. Thus, the peripheral controller may determine that the user would like to transfer a specific amount of funds to the gaming machine via the virtual bill acceptor, which may be associated with the bill acceptor on the gaming machine. The user request may then be processed as a request for the bill acceptor on the gaming machine. Additionally, processing the at least one funds transfer request may include modifying the funds transfer request to reflect the proper source address and destination address. For example, the funds transfer request may be modified to reflect the source address as the bill acceptor and the destination address as the gaming machine processor. This permits for the seamless transfer of information or data to the gaming machine processor from the portable electronic device. In other words, peripheral management device may be invisible to the gaming machine processor.

The processed funds transfer request may then be transmitted to the gaming machine processor (e.g. gaming machine processor 302 as illustrated in FIG. 3) for the gaming machine processor to process. For example, the gaming machine processor may determine that the user transferred the fund amount to play a game of chance which was received by the bill acceptor. The gaming machine processor may then transmit commands and/or acknowledgements to at least one peripheral device of the gaming machine to allow the user to play the game of chance. For example, the gaming machine may transmit a command to the display to present the fund amount on the display. In another example, the gaming machine may transmit an acknowledgment to the bill acceptor to display an acknowledgement message or fund amount on a display of the bill acceptor. In another embodiment, the gaming machine may instruct the user input buttons or switches to activate and light up to indicate that the player may begin to play the game of chance.

The peripheral controller may intercept the commands and/or acknowledgments and process the intercepted commands and/or acknowledgments. The peripheral controller may process the intercepted commands and/or acknowledgements by parsing the commands and/or acknowledgement to determine where the commands and/or acknowledgments should be transmitted to. In other words, the peripheral controller may process the intercepted commands and/or acknowledgements to determine which virtual peripheral device on the portable electronic device the commands and/or acknowledgements should be transmitted to and to determine which peripheral device on the gaming machine the commands and/or acknowledgements should be transmitted to.

For example, if the transmission is an acknowledgement acknowledging the transfer of funds, the peripheral controller may determine that the acknowledgement may be transmitted to the portable electronic device to inform the user of the successful transfer of funds. The acknowledgement may then be displayed on a display of the portable electronic device as illustrated in FIG. 11D.

In one example, the portable electronic device 1100 may present a successful message such as "Congratulations: You have successfully transferred $100.00". Optionally, the user may be able to print a receipt recoding the transfer of funds. For example, the user may select the "Print Receipt" indicator 1118 to create a virtual receipt. The portable electronic device 1100 may then display the virtual receipt (not shown) on the display 1108 and digitally store the virtual receipt in a memory of the portable electronic device 1100.

EXAMPLE 2

Figure 12:
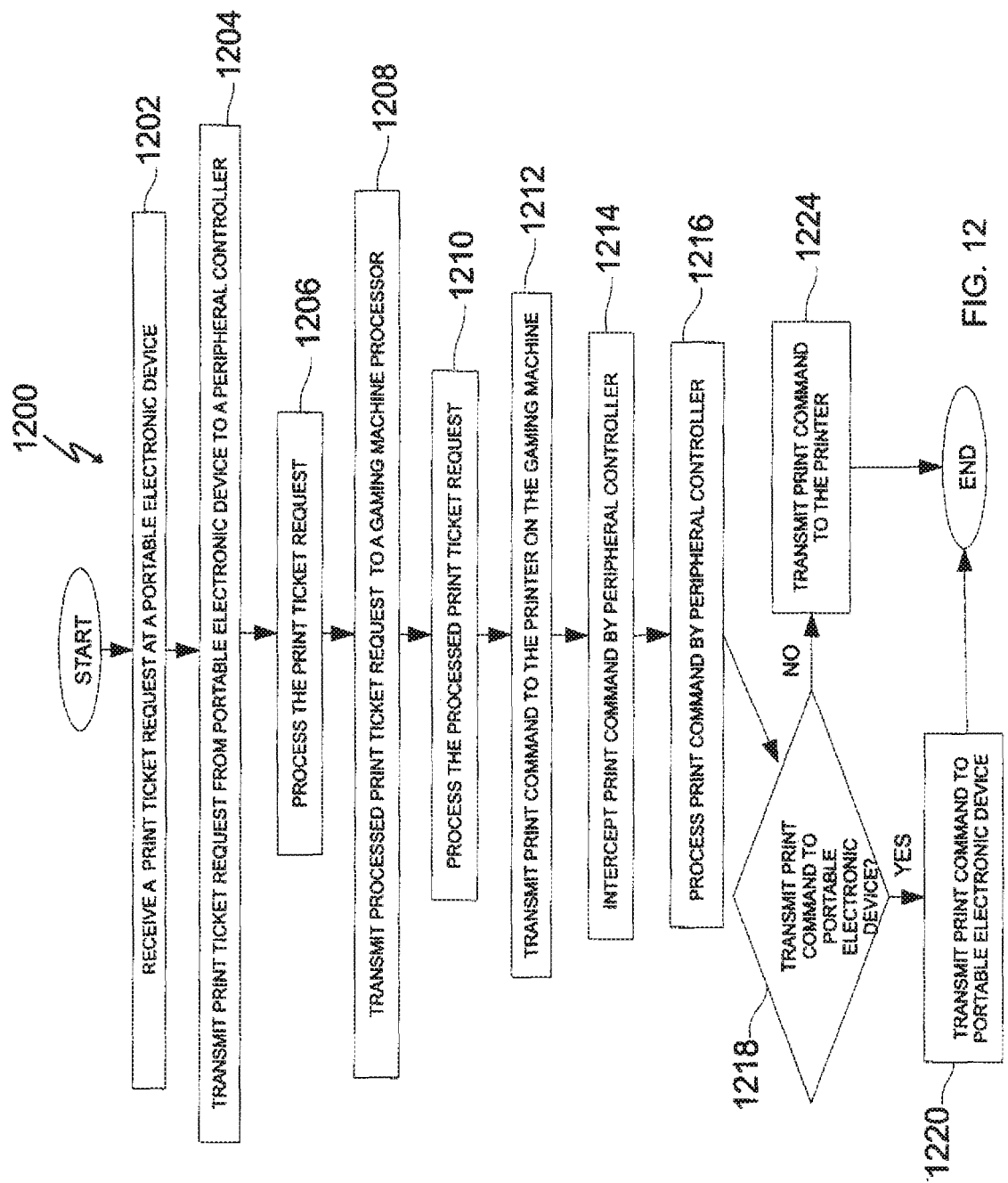
FIG. 12 illustrates an exemplary flow diagram of a method to generate a receipt using a portable electronic device.

FIG. 12 illustrates an exemplary flow diagram of a method to generate a receipt using a portable electronic device. The method 1200 may begin by the portable electronic device receiving a print ticket request to print a ticket at 1202 by the user. For example, the player may have completed a game of chance on the gaming machine and may want to cash out the remaining credits. In one embodiment, the print ticket request may be physically initiated by the user pressing a "Cash Out" indicator (e.g., "Cash Out" indicator 788 illustrated in FIG. 7J) presented on a display of the portable electronic device. In another embodiment, the print ticket request may be an audio command. The audio command may be any audio command received and recognizable by the portable electronic device as an instruction or command to print a ticket. For example, the audio command may include words such as "end game", "print receipt", "cash out", and the like.

The print ticket request may be transmitted from the portable electronic device to a peripheral controller (e.g. peripheral controller 402 illustrated in FIG. 4) at 1204. In one embodiment, the print ticket request may be encrypted by the portable electronic device prior to being transferred. Any known encryption methods may be used such as AES, MAC, HMAC, SHA-2 and the like. The print ticket request may include any necessary information or data to facilitate the printing of a ticket, such as a portable electronic device identifier, destination address (e.g. which gaming machine to cash out of), physical location of the gaming machine, and the like.

The peripheral controller may process the print ticket request at 1206. The peripheral controller may process the print ticket request by parsing the information in the print ticket request to determine which peripheral device is associated with the print ticket request. Each virtual peripheral device on the portable electronic device may be associated with a peripheral device on the gaming machine. Thus, the peripheral controller may determine that the user would like to cash out of the gaming machine by detecting an input from the "Cash Out" indicator. The "Cash Out" indicator may be associated with the "Cash Out" button or switch on the gaming machine. Additionally, the peripheral controller may process the print ticket request by modifying the print ticket request to reflect the proper source address and destination address. For example, the print ticket request may be modified to reflect the source address as the cash out button and the destination address as the gaming machine processor. This permits for the seamless transfer of information or data to the gaming machine processor from the portable electronic device. In other words, peripheral management device is invisible to the gaming machine.

The processed print ticket request may then be transmitted to the gaming machine processor (e.g. gaming machine processor 302 as illustrated in FIG. 3) at 1208 for a gaming machine processor to process at 1210. For example, from the source address, the gaming machine processor may determine that the user pressed the "Cash Out" button on the gaming machine. The gaming machine processor may then transmit a print command to the printer to print an electronic ticket at 1212.

The peripheral controller may intercept the print command at 1214 and process the print command at 1216. The peripheral controller may process the print command by parsing the command to determine where the command it should be transmitted to. In other words, the peripheral controller may process the print command to determine which virtual peripheral device on the portable electronic device the command should be transmitted to and to determine which peripheral device on the gaming machine the command should be transmitted to. This determination may be based upon the destination address of the print command, the command itself, or any other identifying criteria. For example, the peripheral controller may determine that a print command should be transmitted to a printer and not a display. In another example, the destination address of the print command may be the printer on the gaming machine.

If the peripheral controller determines that the command should be transmitted to the portable electronic device at 1218, then the command may be transmitted to the portable electronic device at 1220. For example, the peripheral controller may determine that the print command can be transmitted to a virtual printer of the portable electronic device to print a virtual ticket on the portable electronic device. Thus, the print command may be transmitted to the virtual printer of the portable electronic device at 1220.

Alternatively, the peripheral controller may determine that the ticket should be printed on the printer of the gaming machine and determine not to transmit the print command to the portable electronic device at 1218. The peripheral controller may then transmit the print command to the printer of the gaming machine at 1224.

Figure 13A:
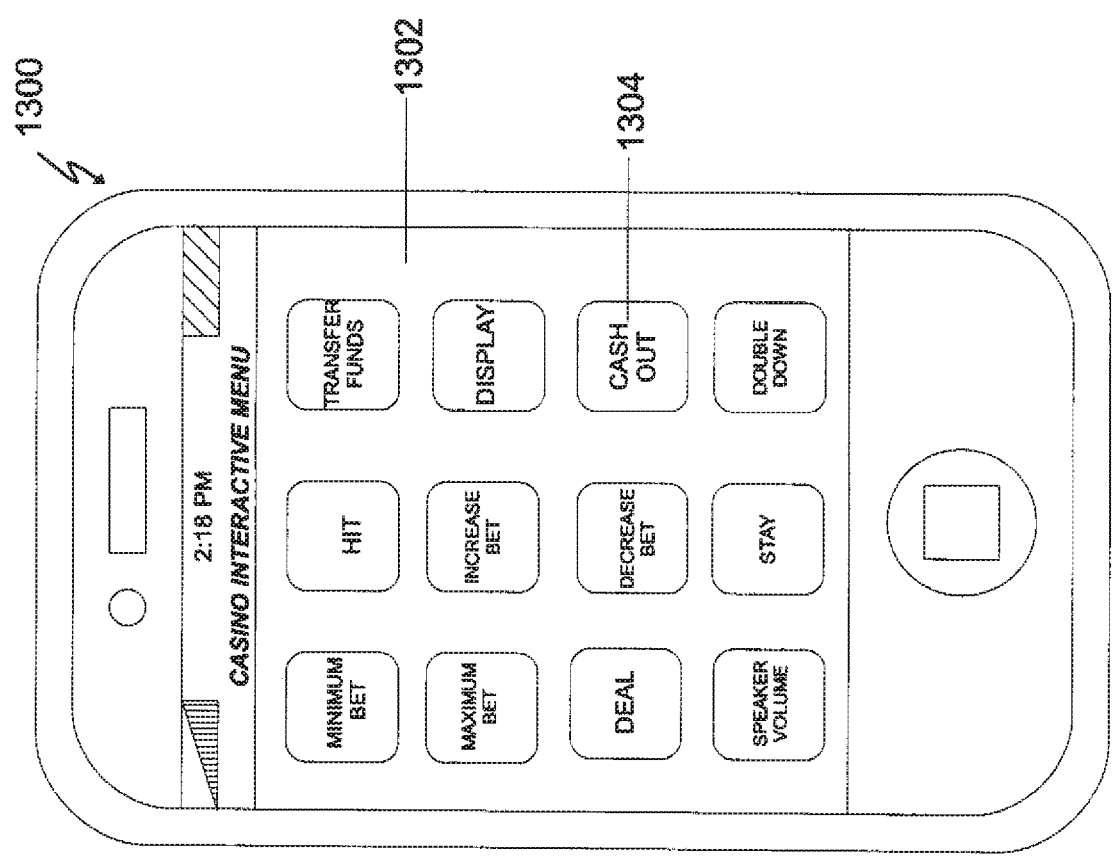
FIGS. 13A-13D illustrate example graphical user interfaces to generate a receipt using a portable electronic device.

FIGS. 13A-13D illustrate example graphical user interfaces to generate a receipt using a portable electronic device. Referring to FIG. 13A, the portable electronic device 1300 may receive a print ticket request to print a ticket by the user. For example, the player may have completed a game of chance on the gaming machine and may want to cash out the remaining credits. In one embodiment, the print ticket request may be physically initiated by the user pressing a "Cash Out" indicator 1304 presented on a display 1302 of the portable electronic device 1300. In another embodiment, the print ticket request may be an audio command. The audio command may be any audio command received and recognizable by the portable electronic device 1300 as an instruction or command to print a ticket. For example, the audio command may include words such as "end game", "print receipt", "cash out", and the like.

Figure 13B:
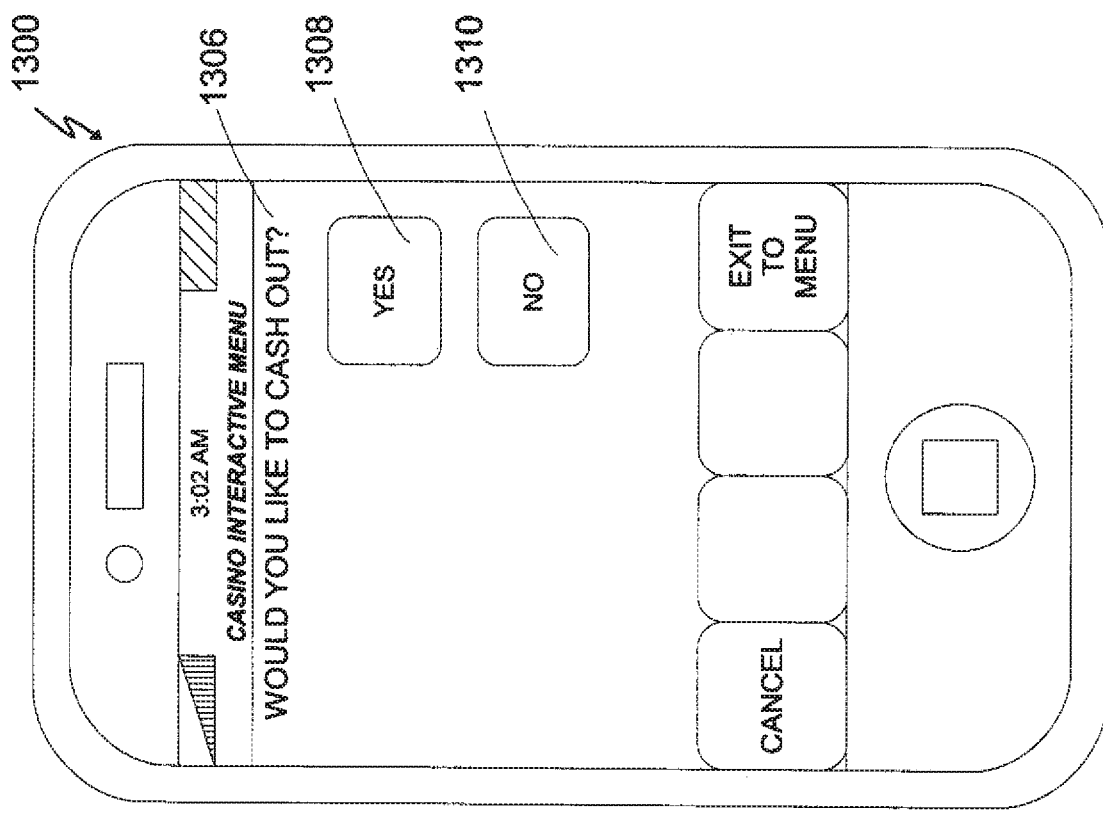

The portable electronic device 1300 may display a confirmation request to the user as illustrated in FIG. 13B. The user may be prompted to confirm the print ticket request by sending a confirmation message such as "Would You Like To Cash Out?" 1306. The user may confirm the request by selecting to "Yes" indicator 1308 or cancel the request by selecting the "No" indicator 1310.

Figure 13C:
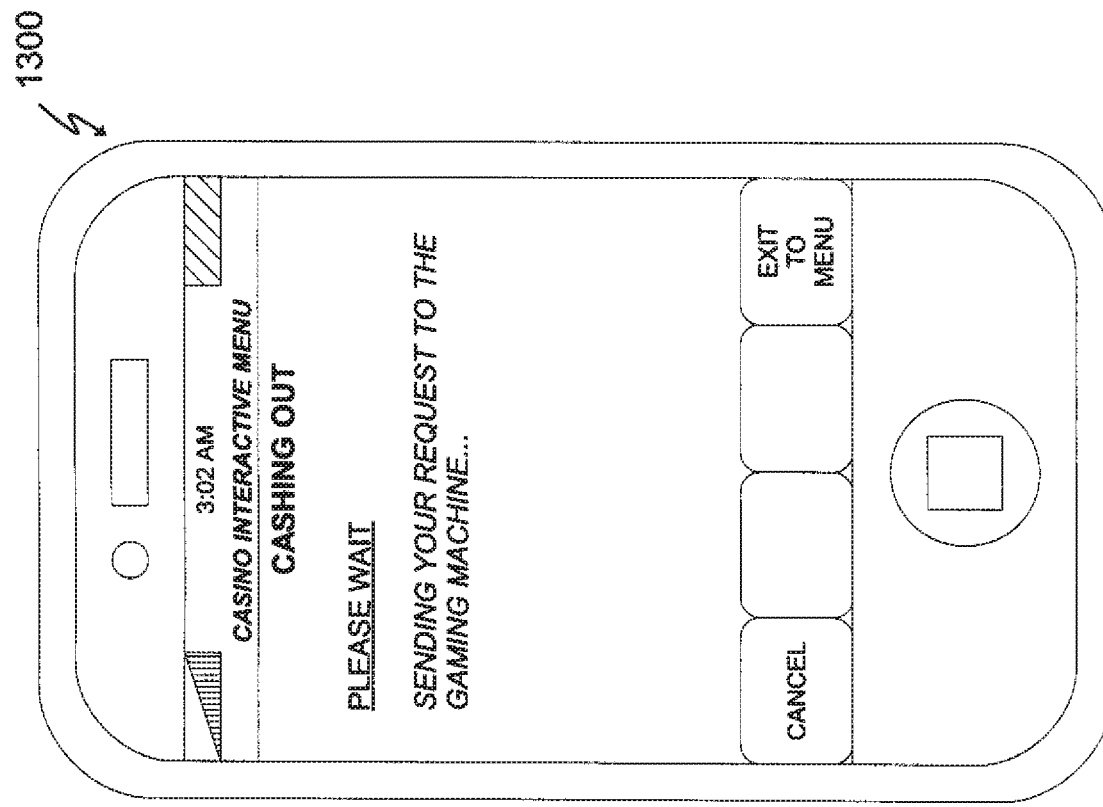

If the user confirms the request by selecting the "Yes" indicator 1308, a confirmation of transfer of the print request may be displayed as illustrated in FIG. 13C. For example, a message such as "Sending Your User Request To The Gaming Machine" message may be displayed on the display 1302 of the portable electronic device 1300 to inform the user of the transmission.

The print ticket request may be transmitted from the portable electronic device 1300 to a peripheral controller (e.g. peripheral controller 402 illustrated in FIG. 4). In one embodiment, the print ticket request may be encrypted by the portable electronic device 1300 prior to being transferred. Any known encryption methods may be used such as AES, MAC, HMAC, SHA-2 and the like. The print ticket request may include any necessary information or data to facilitate the printing of a ticket, such as a portable electronic device identifier, destination address (e.g. which gaming machine to cash out of), physical location of the gaming machine, and the like.

The peripheral controller may process the print ticket request by parsing the information in the print ticket request to determine which peripheral device is associated with the print ticket request. Each virtual peripheral device on the portable electronic device may be associated with a peripheral device on the gaming machine. Thus, the peripheral controller may determine that the user would like to cash out of the gaming machine by detecting an input from the "Cash Out" indicator 1304. The "Cash Out" indicator 1304 may be associated with a "Cash Out" button or switch on the gaming machine. Additionally, the peripheral controller may process the print ticket request by modifying the print ticket request to reflect the proper source address and destination address. For example, the print ticket request may be modified to reflect the source address as the cash out button and the destination address as the gaming machine processor. This permits for the seamless transfer of information or data to the gaming machine processor from the portable electronic device. In other words, peripheral management device is invisible to the gaming machine.

The processed print ticket request may then be transmitted to the gaming machine processor (e.g. gaming machine processor 302 as illustrated in FIG. 3) for the gaming machine processor to process. For example, from the source address, the gaming machine processor may determine that the user pressed the "Cash Out" button on the gaming machine. The gaming machine processor may then transmit a print command to the printer to print an electronic ticket.

Figure 13D:
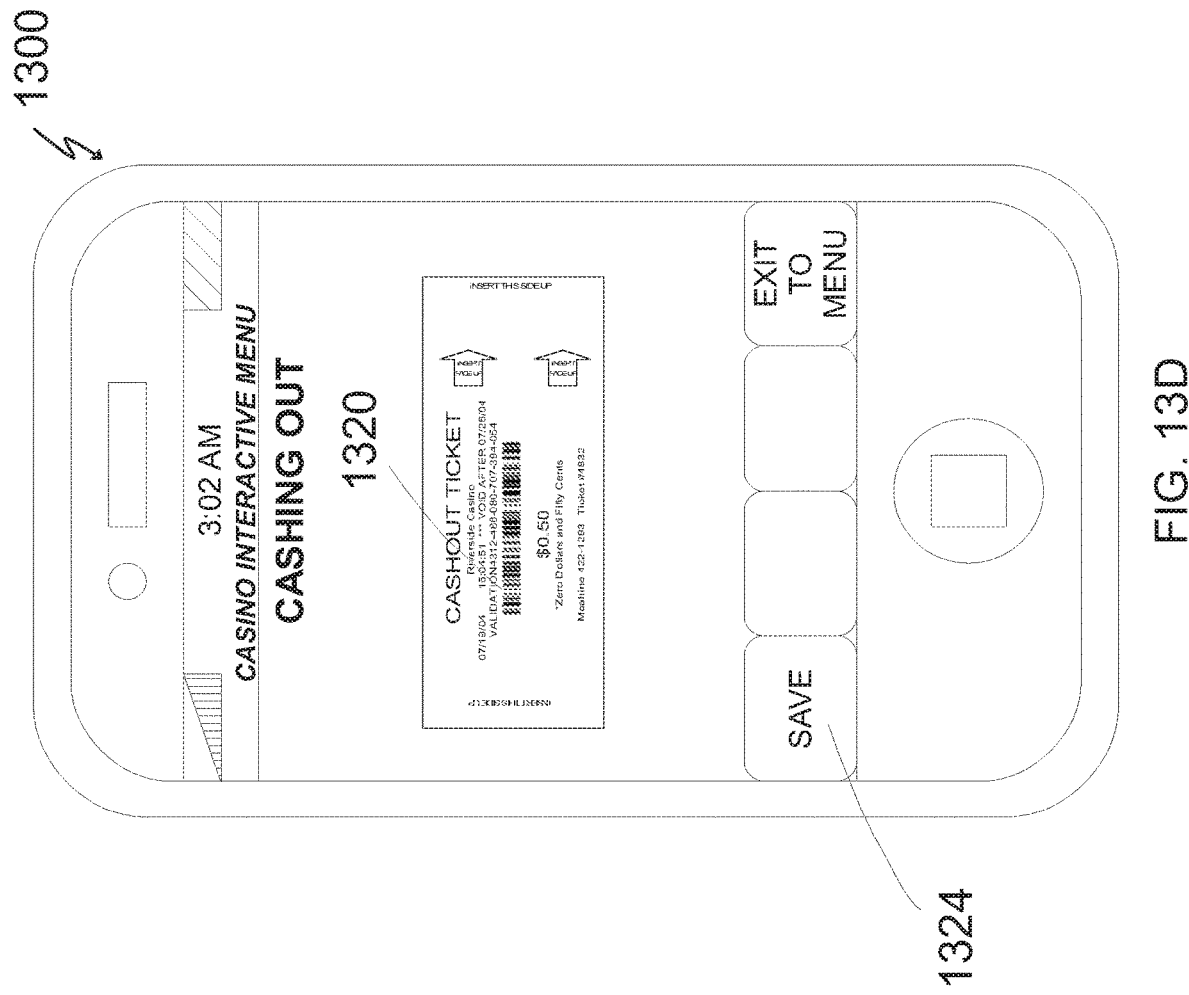

The peripheral controller may intercept the print command and process the print command. The peripheral controller may process the print command by parsing the command to determine where the command it should be transmitted to. In other words, the peripheral controller may process the print command to determine which virtual peripheral device on the portable electronic device the command should be transmitted to and to determine which peripheral device on the gaming machine the command should be transmitted to. In one embodiment, the peripheral controller may determine that the original print ticket request was generated at the portable electronic device 1300 and the command should therefore be transferred to the portable electronic device 1300. In another embodiment, the peripheral controller may determine that it is in communication with the portable electronic device 1300 and automatically transmit the command to the portable electronic device 1300. The print command may be transmitted to a virtual printer of the portable electronic device to print a virtual ticket on the portable electronic device as illustrated in FIG. 13D. In one embodiment, the virtual ticket 1320 may be presented on the display 1302. In another embodiment, the virtual ticket may be saved in a memory on the portable electronic device 1300 by pressing the "Save" indicator 1324.

Additional details on peripheral devices for gaming machines are provided in U.S. patent application Ser. No. 12/945,888, entitled "MULTI-FUNCTION PERIPHERAL DEVICE," filed Nov. 14, 2010, and hereby incorporated herein by reference.

While embodiments and applications of this invention have been shown and described, it would be apparent to those skilled in the art having the benefit of this disclosure that many more modifications than mentioned above are possible without departing from the inventive concepts herein.

What is claimed is:

1. A method for transferring funds to a gaming device, comprising:
    wirelessly coupling a portable electronic device to the gaming device, the gaming device having a device identifier, and the portable electronic device being associated with a user;
    receiving, at an electronic device, a funds transfer request requesting to transfer an amount of funds from an external account to the gaming device, the external account being independent of the gaming device, the funds transfer request being initiated from the portable electronic device, the funds transfer request including at least (i) a funds transfer amount, (ii) the device identifier for the gaming device and (iii) a user identifier or a device identifier for the portable electronic device associated with a user;
    determining, at the electronic device, whether the user is authorized to make the requested transfer of the funds transfer amount from the external account, the authorization being determined with regard to a user account, the user account being associated with the user identifier, a ticket identifier, or the device identifier;
    initiating transfer of the funds transfer amount from the external account to make such funds available for use at the gaming device if the determining determines that the user is authorized to make the requested transfer of the funds transfer amount; and
    subsequently providing an indication of the transfer of funds to the portable electronic device.

2. A method as recited in claim 1,
    wherein the portable electronic device has a graphical user interface displayed by the portable electronic device, and
    wherein the funds transfer request is initiated via the graphic user interface displayed by the portable electronic device.

3. A method as recited in claim 1, wherein a source of funds for the transfer of the funds transfer amount is at least one of a credit card, a checking account, a virtual ticket, or an electronically-readable ticket.

4. A method as recited in claim 1, wherein the funds transfer request includes a source of funds for the transfer of the funds transfer amount.

5. A method as recited in claim 4, wherein the source of funds for the transfer of the funds transfer amount is at least a user account.

6. A method as recited in claim 4, wherein the source of funds for the transfer of the funds transfer amount is at least one of a virtual ticket or an electronically-readable ticket.

7. A method as recited in claim 1, wherein the gaming device is a slot machine or an electronic table.

8. A non-transitory computer readable medium including at least computer program code to be executed by an electronic device for transferring funds from a portable electronic device to a gaming device, the portable electronic device configured to wirelessly couple the portable electronic device to the gaming device, the gaming device having a device identifier, and the portable electronic device being associated with a user, the computer readable medium comprising:
    computer program code for receiving a funds transfer request requesting to transfer an amount of funds from an external account to the gaming device, the external account being independent of the gaming device, the funds transfer request being initiated from the portable electronic device, the funds transfer request including at least (i) a funds transfer amount, (ii) the device identifier for the gaming device and (iii) a user identifier or a device identifier for the portable electronic device associated with a user;
    computer program code for determining whether the user is authorized to make the requested transfer of the funds transfer amount from the external account, the authorization being determined with regard to a user account, the user account being associated with the user identifier, a ticket identifier, or the device identifier;
    computer program code for initiating transfer of the funds transfer amount from the external account to make such funds available for use at the gaming device if the determining determines that the user is authorized to make the requested transfer of the funds transfer amount; and computer program code for subsequently providing an indication of the transfer of funds to the portable electronic device.

9. A non-transitory computer readable medium as recited in claim 8, wherein the portable electronic device has a graphical user interface displayed by the portable electronic device, and wherein the funds transfer request is initiated via the graphic user interface displayed by the portable electronic device.

10. A non-transitory computer readable medium as recited in claim 9, wherein a source of funds for the transfer of the funds transfer amount is at least one of a credit card, a checking account, a virtual ticket, or an electronically-readable ticket.

11. A non-transitory computer readable medium as recited in claim 8, wherein a source of funds for the transfer of the funds transfer amount is at least one of a credit card or a checking account.

12. A non-transitory computer readable medium as recited in claim 8, wherein a source of funds for the transfer of the funds transfer amount is at least one of a virtual ticket or an electronically-readable ticket.

13. A non-transitory computer readable medium as recited in claim 8, wherein the funds transfer request includes a source of funds for the transfer of the funds transfer amount.

14. A non-transitory computer readable medium as recited in claim 13, wherein the source of funds for the transfer of the funds transfer amount is at least a user account.

15. A non-transitory computer readable medium as recited in claim 13, wherein the source of funds for the transfer of the funds transfer amount is at least one of a virtual ticket or an electronically-readable ticket.

16. A non-transitory computer readable medium as recited in claim 8, wherein the gaming device is a slot machine or an electronic table.

17. A gaming device for operation at a gaming establishment, comprising:

a processor configured to operate the gaming device to provide a game of chance to a user of the gaming machine;

a user input device configured to receive one or more user inputs from the user for use with the game of chance;

a display device configured to present gaming information pertaining to the game of chance;

a wireless interface configured to support wireless communication with at least one portable electronic device; and wherein the processor is configured to:

receive a funds transfer request requesting to transfer an amount of funds from an external account to the gaming device, the external account being independent of the gaming establishment and the gaming device, the funds transfer request being initiated from the portable electronic device, the funds transfer request including at least (i) a funds transfer amount, (ii) a device identifier for the gaming device and (iii) a user identifier or a device identifier for the portable electronic device associated with a user;

determine whether the user is authorized to make the requested transfer of the funds transfer amount from the external account, the authorization being determined with regard to a user account, the user account being associated with the user identifier, a ticket identifier, or the device identifier;

initiate transfer of the funds transfer amount from the external account to make such funds available for use at the gaming device operating at the gaming establishment if determined that the user is authorized to make the requested transfer of the funds transfer amount; and subsequently provide an indication of the transfer of funds to the portable electronic device.

18. A gaming device as recited in claim 17, wherein the processor is further configured to:

determine whether the portable electronic device is proximate to the gaming device; and deem the portable electronic device authorized for use with the gaming device if the portable electronic device is determined to be proximate to the gaming device.

19. A gaming device as recited in claim 17, wherein the gaming device is further configured to:

receive location information for the portable electronic device; and deem the portable electronic device authorized for use with the gaming device based on the location information.

20. A gaming device as recited in claim 17, wherein the gaming device is a slot machine or an electronic table.

\* \* \* \* \*